(12) United States Patent
Sweeney

(10) Patent No.: US 8,818,862 B2
(45) Date of Patent: Aug. 26, 2014

(54) SYSTEM AND METHOD FOR PURCHASING ADVERTISEMENTS ASSOCIATED WITH WORDS AND PHRASES

(75) Inventor: Peter Sweeney, Kitchener (CA)

(73) Assignee: Primal Fusion, Inc., Waterloo (CA)

( * ) Notice: Subject to any disclaimer, the term of this patent is extended or adjusted under 35 U.S.C. 154(b) by 61 days.

(21) Appl. No.: 13/341,881

(22) Filed: Dec. 30, 2011

(65) Prior Publication Data

US 2012/0185340 A1 Jul. 19, 2012

Related U.S. Application Data

(63) Continuation-in-part of application No. 13/164,732, filed on Jun. 20, 2011, and a continuation-in-part of application No. 13/162,069, filed on Jun. 16, 2011, which is a continuation-in-part of application No. 12/671,846, filed as application No. PCT/CA2009/000567 on May 1, 2009.

(60) Provisional application No. 61/428,564, filed on Dec. 30, 2010, provisional application No. 61/428,435, filed on Dec. 30, 2010, provisional application No. 61/428,445, filed on Dec. 30, 2010, provisional application No. 61/428,676, filed on Dec. 30, 2010, provisional application No. 61/430,090, filed on Jan. 5, 2011, provisional application No. 61/357,509, filed on Jun. 22, 2010, provisional application No. 61/357,512, filed on Jun. 22, 2010, provisional application No. 61/430,138, filed on Jan. 5, 2011, provisional application No. 61/430,141, filed on Jan. 5, 2011, provisional application No. 61/430,143, filed on Jan. 5, 2011, provisional application No. 61/049,581, filed on May 1, 2008.

(51) Int. Cl.
*G06Q 30/00* (2012.01)
*G06Q 30/02* (2012.01)

(52) U.S. Cl.
CPC ........ *G06Q 30/0273* (2013.01); *G06Q 30/0251* (2013.01)
USPC ..................... 705/14.69; 705/14.49

(58) Field of Classification Search
USPC ..................................... 705/14.69
See application file for complete search history.

(56) References Cited

U.S. PATENT DOCUMENTS

| | | | |
|---|---|---|---|
| 7,657,520 B2 * | 2/2010 | Chen et al. ..................... 707/751 |
| 2007/0027749 A1 * | 2/2007 | Peiro et al. ..................... 705/14 |
| 2008/0126178 A1 * | 5/2008 | Moore ............................ 705/10 |
| 2009/0055267 A1 * | 2/2009 | Roker ............................ 705/14 |
| 2009/0198684 A1 * | 8/2009 | Collins et al. ..................... 707/5 |

* cited by examiner

*Primary Examiner* — John G Weiss
*Assistant Examiner* — Scott C Anderson
(74) *Attorney, Agent, or Firm* — Wolf, Greenfield & Sacks, P.C.

(57) ABSTRACT

Disclosed is a system and method for enhancing value for advertisers by helping them select and initiate the purchase of an advertisement associated with an advertising (ad) words or phrases that have strong semantic relationships to a given context, but which are not necessarily the most popular ad words or phrases with the highest costs. Advertisements associated with ad words or phrases that have strong semantic relationships to a given context, and yet are still cost effective in that their calculated value exceeds the costs of purchasing the ad keywords, are bid for and bought. In an embodiment, the system and method may be adapted to automatically purchase advertisements associated with ad words or phrases when the ad words or phrases fall within a desired price range based on their calculated value. By automatically purchasing such advertisements, the return on investment (ROI) for an advertiser may be improved.

26 Claims, 11 Drawing Sheets

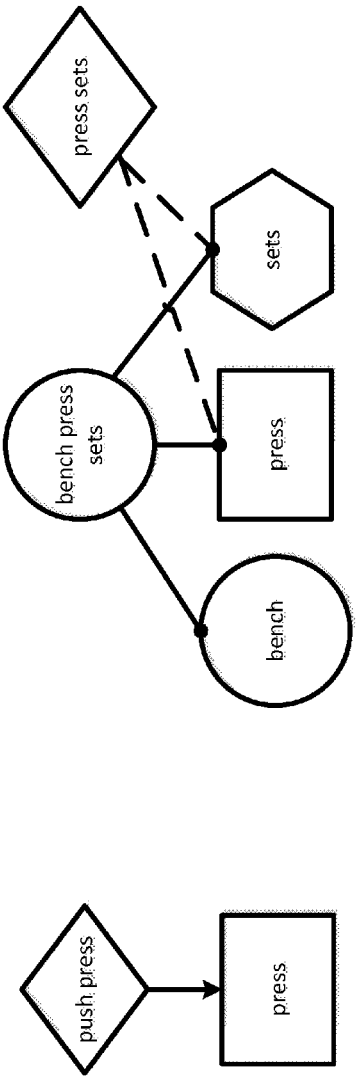
FIG. 5A
FIG. 5B
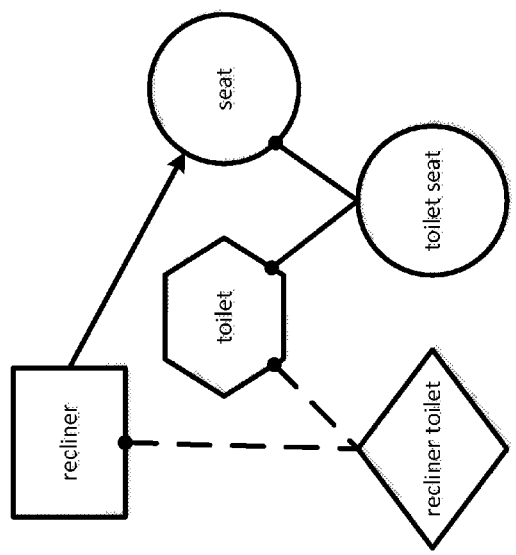
FIG. 5C
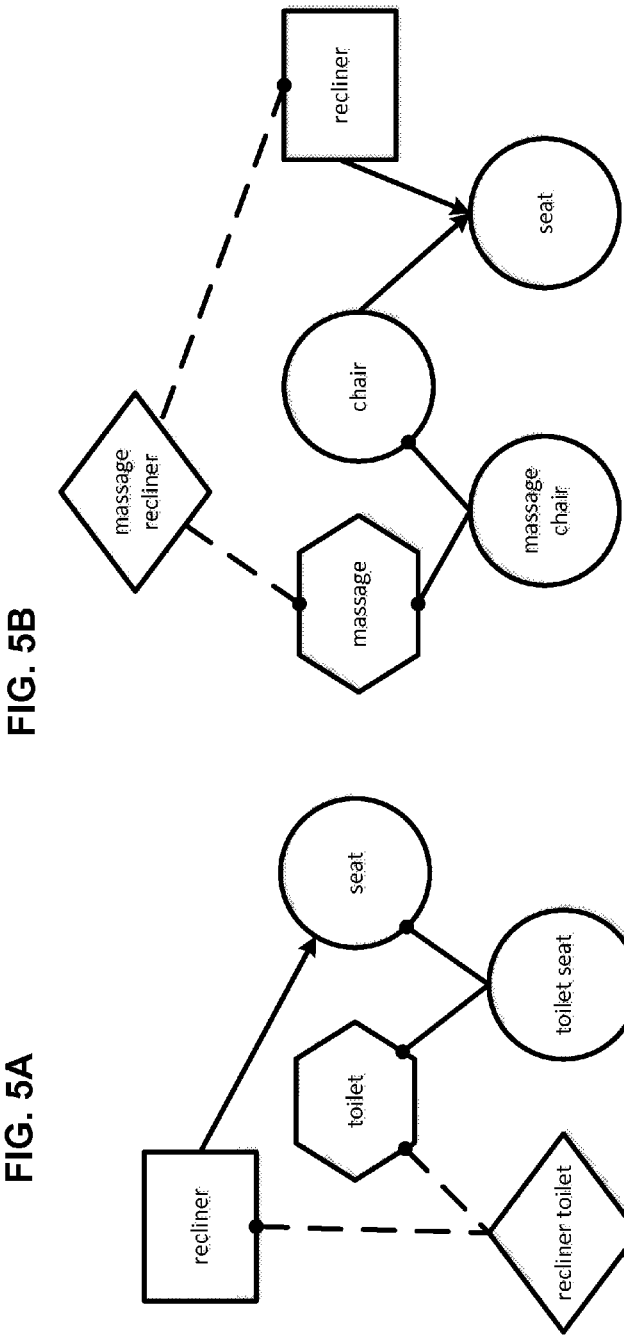
FIG. 5D

SYSTEM AND METHOD FOR PURCHASING ADVERTISEMENTS ASSOCIATED WITH WORDS AND PHRASES

CROSS-REFERENCE TO RELATED APPLICATIONS

The present application claims the benefit under 35 U.S.C. §119(e) of U.S. Provisional Application Ser. No. 61/428,564, filed on Dec. 30, 2010, titled "System and Method for Advertising Campaign Management," and of U.S. Provisional Application Ser. No. 61/428,435, filed on Dec. 30, 2010, titled "Method and Apparatus for Semantic Query Expansion," and of U.S. Provisional Application Ser. No. 61/428,445, filed Dec. 30, 2010, titled "Method and Apparatus for Displaying Promotional Content," and of U.S. Provisional Application Ser. No. 61/428,676, filed Dec. 30, 2010, titled "Method and Apparatus for Spatio-Temporal Semantic Synthesis," and of U.S. Provisional Application Ser. No. 61/430,090, filed Jan. 5, 2011, titled "Method and Apparatus for Generating Semantically Proximate Concepts." The present application is also a continuation-in-part of U.S. application Ser. No. 13/164,732, filed Jun. 20, 2011, titled "System of Computerized Agents and User-Directed Semantic Networking," and a continuation-in-part of U.S. patent application Ser. No. 13/162,069 filed on Jun. 16, 2011, titled "Methods and Apparatus for Searching of Content Using Semantic Synthesis."

U.S. patent application Ser. No. 13/164,732 claims the benefit under 35 U.S.C. §119(e) of U.S. Provisional Application Ser. No. 61/357,509, filed on Jun. 22, 2010, titled "System of Computerized Agents and Semantic Networks."

U.S. patent application Ser. No. 13/162,069 claims the benefit under 35 U.S.C. §119(e) of U.S. Provisional Application Ser. No. 61/357,512, filed on Jun. 22, 2010, titled "Methods and Apparatus for Searching of Content Using Semantic Synthesis," and of U.S. Provisional Application Ser. No. 61/430,138, filed Jan. 5, 2011, titled "Methods and Apparatus for Presenting Concepts Related to an Active Concept," and of U.S. Provisional Application Ser. No. 61/430,141, filed Jan. 5, 2011, titled "Methods and Apparatus for Identifying Terms for Monetization," and of U.S. Provisional Application Ser. No. 61/430,143, filed Jan. 5, 2011, titled "Methods and Apparatus for Taking an Advertising Action Using a Bot." U.S. patent application Ser. No. 13/162,069 is also a continuation-in-part of U.S. patent application Ser. No. 12/671,846 filed on Feb. 2, 2010, titled "Method System, and Computer Program for User-Driven Dynamic Generation of Semantic Networks and Media Synthesis."

U.S. patent application Ser. No. 12/671,846 is a national stage, under 35 U.S.C. §371, of PCT Application No. PCT/CA2009/000567 filed. May 1, 2009, titled "Method, System, and Computer Program for User-Driven Dynamic Generation of Semantic Networks and Media Synthesis," which claims the benefit under U.S.C. §119(e) of U.S. Provisional Application Ser. No. 61/049,581 filed on May 1, 2008, titled "Method, System, and Computer Program for User-Driven Dynamic Generation of Semantic Networks." All of the above-mentioned applications are hereby incorporated by reference in their entireties.

FIELD OF INVENTION

The teachings disclosed herein relate to the field of information retrieval. In particular, the teachings disclosed herein relate to the deployment of methods, in a digital information system environment, for using information associated with a user or users together with one or more data sets expressed as knowledge representations in order to identify and provide information, from a larger set of digital content, that may be of interest to the user(s).

BACKGROUND

Information technology is often used to provide users with various types of information, such as text, audio, video, and any suitable other type of information. In some cases, information is provided to a user in response to an action that the user has taken. For example, information may be provided to a user in response to a search query input by the user or in response to the user having subscribed to content such as an e-mail alert(s) or an electronic newsletter(s). In other cases, information is provided or "pushed" to a user without the user having specifically requested such information. For example, a user may occasionally be presented with advertisements or solicitations.

There is a vast array of content that can be provided to users via information technology. Indeed, because of the enormous volume of information available via the Internet, the World Wide Web (WWW), and any other suitable information provisioning sources, and because the available information is distributed across an enormous number of independently owned and operated networks and servers, locating information of interest to users presents challenges. Similar challenges exist when the information of interest is distributed across large private networks.

Search engines have been developed to aid users in locating desired content on the Internet. A search engine is a computer program that receives a search query from a user (e.g., in the form of a set of keywords) indicative of content desired by the user, and returns information and/or hyperlinks to information that the search engine determines to be relevant to the user's search query.

Search engines typically work by retrieving a large number of WWW web pages and/or other content using a computer program called a "web crawler" that explores the WWW in an automated fashion (e.g., following every hyperlink that it comes across in each web page that it browses). The located web pages and/or content are analyzed and information about the web pages or content is stored in an index. When a user or an application issues a search query to the search engine, the search engine uses the index to identify the web pages and/or content that it determines to best match the user's search query and returns a list of results with the best-matching web pages and/or content. Frequently, this list is in the form of one or more web pages that include a set of hyperlinks to the web pages and/or content determined to best match the user's search query.

The sheer volume of content accessible via digital information systems presents a number of information retrieval problems. One challenge is how advertisers can achieve better return on their investment given the vast number of potential users that they could potentially target with advertisements that are relevant to the vast range of interests of such users.

SUMMARY

The present disclosure relates to a system and method for purchasing an advertisement associated with an advertising (ad) words and phrases based on a calculated value to an ad purchaser.

In an aspect, there is provided a computer-implemented method for purchasing an advertisement based on a knowledge representation, the method comprising: obtaining a purchaser-context information associated with at least one purchaser; purchasing, with at least one processor executing stored program instructions, an advertisement associated with at least one advertising word or phrase that has a value to the purchaser that exceeds the purchase price of the advertisement associated with the at least one advertising word or phrase; wherein the value is a based on a semantic relevance, derived from a knowledge representation, between a first concept associated with the purchaser-context information and a second concept associated with the at least one advertising word or phrase; and the first and second concepts in the knowledge representation are represented by a data structure in the knowledge representation.

In an embodiment, the advertising word or phrase is based on a retrieval operation or synthesis operation performed on the knowledge representation.

In another embodiment, the knowledge representation is a semantic network.

In another aspect, there is provided a system for purchasing an advertisement based on a knowledge representation, the system adapted to: obtain a purchaser-context information associated with at least one purchaser; purchase, with at least one processor executing stored program instructions, an advertisement associated with at least one advertising word or phrase that has a value to the purchaser that exceeds the purchase price of the advertisement associated with the at least one advertising word or phrase; wherein the value is a based on a semantic relevance, derived from a knowledge representation, between a first concept associated with the purchaser-context information and a second concept associated with the at least one advertising word or phrase; and the first and second concepts in the knowledge representation are represented by a data structure in the knowledge representation.

In this respect, before explaining at least one embodiment of the system and method of the present disclosure in detail, it is to be understood that the present system and method is not limited in its application to the details of construction and to the arrangements of the components set forth in the following description or illustrated in the drawings. The present system and method is capable of other embodiments and of being practiced and carried out in various ways. Also, it is to be understood that the phraseology and terminology employed herein are for the purpose of description and should not be regarded as limiting.

BRIEF DESCRIPTION OF DRAWINGS

The accompanying drawings are not intended to be drawn to scale. Like elements are identified by the same or like reference designations when practical. For purposes of clarity, not every component may be labelled in every drawing. In the drawings:

FIGS. 5A-5H illustrate various approaches for obtaining concepts relevant to an active concept representing user context information, in accordance with some embodiments of the present disclosure.

Figure 1:
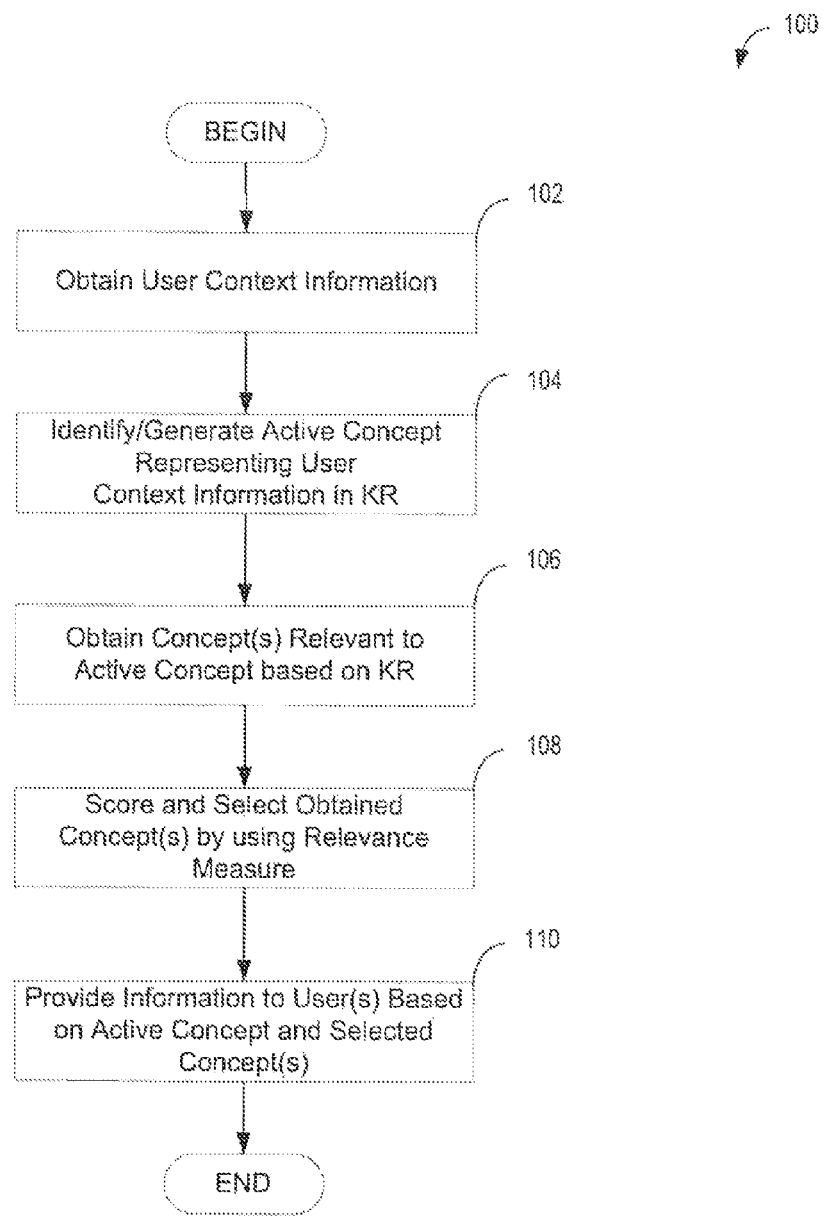
FIG. 1 is a flowchart of an illustrative process for providing a user with information selected from a large set of digital content, in accordance with some embodiments of the present disclosure.

The foregoing is a non-limiting summary of the invention, which is defined by the attached claims.

DETAILED DESCRIPTION

As noted above, the availability of a large volume of information, from various information-provisioning sources such as the Internet, makes it difficult to determine what information may be of interest to users and should be presented to them. For example, it may be difficult to determine what information (e.g., news, advertisements, updates about other people, etc.) should be presented to a user on a website (e.g., a news website, a web portal, a social networking website, etc.) after the user navigates to the website, but without explicitly specifying what information the user is interested in.

Even in a scenario, such as online search, where the user provides an explicit indication (e.g., a search query) of what information the user may be interested in, such an indication may not be sufficient to accurately identify the content to present to the user from among the large set of content that may be presented to the user. Most conventional search engines simply perform pattern matching between the literal terms in the user's search query and literal terms in the content indexed by the search engine to determine what pieces of content are relevant to the user's query. As such, when the terms in the user's search query do not match the literal terms in the indexed content, the user may not be provided with the information the user is seeking. Also when a user enters a search query containing a term whose meaning is ambiguous, the user may be provided with information entirely unrelated to the meaning of the term that the user intended. As such, the user may be overwhelmed with information irrelevant to the user's interests.

In these and other settings, semantic processing techniques may be used to identify information, from among a large set of digital content, that the user is likely to be interested in. In particular, applying semantic processing techniques to information associated with a user may help to identify the information in which the user may be interested. As described in greater detail below, information associated with a user may include, but is not limited to, information about the user (e.g., demographic information, geo-spatial information, the user's browsing history, etc.) and/or any information provided by the user (e.g., a search query or queries provided by the user, a user-constructed online profile, etc.).

Aspects of semantic processing techniques relate to constructing and using knowledge representations to support machine-based storage, knowledge management, and reasoning systems. Conventional methods and systems exist for utilizing knowledge representations (KRs) constructed in accordance with various types of knowledge representation models, which may be realized as concrete data structures, including structured controlled vocabularies such as taxonomies, thesauri, and faceted classifications; formal specifications such as semantic networks and ontologies; and unstructured forms such as documents based in natural language.

While it is not intended that the claimed invention be limited to specific knowledge representations, a preferred form is the type of formal specification referred to as a semantic network. Semantic networks are explained in many sources, noteworthy among them being U.S. application Ser. No. 12/671,846, titled "Method, System, And Computer Program For User-Driven Dynamic Generation Of Semantic Networks And Media Synthesis" by Peter Sweeney et al., which is hereby incorporated by reference.

Semantic networks have a broad utility as a type of knowledge representation. As machine-readable data, they can support a number of advanced technologies, such as artificial intelligence, software automation and agents, expert systems, and knowledge management. Additionally, they can be transformed into various forms of media (i.e., other KRs). In other words, the synthesis or creation of semantic networks can support the synthesis of a broad swath of media to extract additional value from the semantic network.

In some embodiments, a semantic network may be represented as a data structure embodying a directed graph comprising vertices or nodes that represent concepts, and edges that represent semantic relations between the concepts. The data structure embodying a semantic network may be encoded (i.e., instantiated) in a non-transitory, tangible computer-readable storage medium. As such, a semantic network may be said to comprise one or more concepts. Each such concept may be represented by a data structure storing any data associated with one or more nodes in the semantic network representing the concept. An edge in the directed graph may represent any of different types of relationships between the concepts associated with the two nodes that the edge connects. For instance, the relationship represented by an edge in a semantic network may be a "defined-by" relationship or an "is-a" relationship. In the drawings (e.g., FIGS. 5A-5H, FIGS. 8A-8C, etc.) that show illustrative semantic networks, "defined-by" relationships are indicated by edges ending with a filled-in circle and "is-a" relationships are indicated by edges ending with an arrow. For example, reference numeral 808 identifies a "defined-by" relationship and reference numeral 806 identifies an "is-a" relationship.

Concepts may be defined in terms of compound levels of abstraction through their relationships to other entities and structurally in terms of other, more fundamental KR entities such as keywords and morphemes. Such a structure may be referred to as a concept definition. Collectively, the more fundamental knowledge representation entities such as keywords and morphemes that comprise concepts are referred to as attributes of the concept.

As explained in U.S. patent application Ser. No. 12/671,846, concepts may be defined in terms of compound levels of abstraction through their relationship to other entities and structurally in terms of other, more fundamental knowledge representation entities such as keywords and morphemes. Such a structure may be referred to as a "concept definition."

Information associated with a user may be used together with at least one knowledge representation, such as a semantic network, in order to infer what information may be of interest to the user. Any suitable knowledge representation may be used. For example, a semantic network representing knowledge associated with content, a subset of which may be of interest to the user, may be used. Such a KR may be constructed from any of numerous data sources including any suitable information provisioning sources and vocabularies.

Further, information associated with the user may be used together with one or more knowledge representations to identify concepts semantically relevant to information associated with the user. In turn, the identified concepts may be used to determine what information may be of interest to the user in a broad range of applications. For example, finding concepts that are semantically relevant to terms in a user's search query may be useful in determining the semantic meaning of the query and what information the user may be seeking The query may then be augmented with keywords derived from the identified concepts and improved search results may be returned to the user. As another example, concepts identified as being semantically relevant to information contained in a user's online profile may be useful in determining what information (e.g., advertisements, news, etc.) to present to the user when that user is online.

Accordingly, in some embodiments, methods for identifying concepts semantically relevant to information associated with the user are disclosed. A concept representing at least a portion of the information associated with a user, termed an "active concept," may be identified or synthesized (i.e., generated) and one or more concepts semantically relevant to the active concept may be obtained. In some instances, concepts semantically relevant to the active concept may be identified in a semantic network; but in other instances, concepts relevant to the active concept may be synthesized by using the active concept and at least one other concept in the semantic network. Concepts semantically relevant to the active concept may be identified and/or synthesized based at least in part on the structure of the semantic network.

In some embodiments, after concepts semantically relevant to the active concept are obtained, the obtained concepts may be scored. The scores may be calculated in any of numerous ways and, for example, may be calculated based at least in part on the structure of (the data structure of the graph embodying) the semantic network. In turn, the scores may be used to select a subset of the concepts semantically relevant to the active concept. Then, the selected concepts may be used to provide the user with information in which the user may be interested.

In some embodiments, information associated with one or more users may be used to construct a user-specific knowledge representation corresponding to the user(s). The user-specific knowledge representation may be constructed from information associated with the user(s) and at least one knowledge representation, such as a semantic network. Accordingly, a user-specific knowledge representation may encode information related to the user(s). Any suitable knowledge representation may be used including, but not limited to, a knowledge representation that represents knowledge associated with content, a subset of which the user(s) may be interested in. The resulting user-specific knowledge representation may be used to identify concepts related to information in which the user(s) may be interested.

Advantageously, in some embodiments, a user-specific knowledge representation may be stored and used multiple times. This allows semantic processing for a user to take advantage of previously-performed semantic processing for the user and/or one or more other users. For example, if a user-specific knowledge representation was generated based on information associated with one user in a group of users (e.g., an employee of company X), the same user-specific knowledge representation may be used to identify concepts semantically relevant to information associated with another user in the same group (e.g., another employee of company X).

As previously mentioned, it is often the case that, when users search for information, the terms used in their search queries may not literally match the terms appearing in the content being searched; each side expresses the same or similar concepts in different terms. In such cases, the returned search results, if any, may include fewer quality results than actually are available. Consequently, it is often difficult for users to find all the information they need even when the relevant content exists.

One example of this situation may occur when a user searches for information within a specialized set of content (e.g., content accessible through a particular website or websites, a particular network, a particular portal, etc.) using terms that appear infrequently in the set of content being searched. For instance, a user may search for information via a medical website within specialized content produced by and intended for medical practitioners and researchers. However, because users of the website may not be medically trained, their search queries may not use many of the terms commonly found in medical articles pertaining to the relevant subject matter. Accordingly, only a few of the terms in user-provided search queries, if any, may appear in the content accessible through the website and many potentially relevant items may be missed. Another example is when users try to search for information in customer support content. Users may not be technically savvy, but yet need to use specific technical terms in order to find the content that will be helpful to them. Many other examples will be apparent to those skilled in the art.

Some of the above-mentioned shortcomings of conventional search methods may be addressed by using a secondary or "reference" set of content to improve the quality of search results being returned to users that wish to search a primary, or "target," set of content. The primary set of content may be any suitable set of content and, for example, may be content accessible via a particular website (e.g., an e-commerce website, a website of a business, a website providing access to one or more databases, etc.). A secondary or reference set of content may be any suitable set of content and, for example, may be content in any information repository (e.g., Wikipedia, WordNet, etc.), database, or content-provisioning source. Though it should be recognized that these are only examples and that the target set of content and the reference set of content may be any suitable sets of content, as aspects of the present invention are not limited in this respect.

By way of illustration, in the above example, a reference domain comprising information about diseases commonly known in the public sphere may help to relate terms in users' search queries in a medical website to terms in content accessible through that website. Indeed, it may be easier to relate a user's search query, such as "Flu Virus," to content accessible through the medical website, which may refer to viral diseases only by using official classifications for the associated virus, if the reference set of content includes information that identifies "Orthomyxoviridae" as a family of influenza viruses and that influenza is commonly known as the "flu." Simply put, the reference set of content may serve as a type of "middle-layer" or a "translation or interpretation medium" to aid in translating terms appearing in search queries to terms appearing in the target set of content being searched.

Semantic processing techniques may be employed in order to use content in a reference set of content to improve the quality of search results being returned to users that wish to search a target set of content. Accordingly, in some embodiments, a reference knowledge representation as well as a target knowledge representation may be employed. The reference (target) knowledge representation may be any suitable type of knowledge representation, such as a semantic network, and may represent knowledge associated with content in a reference (target) set of content. The reference (target) knowledge representation may be constructed in any suitable way and, for example, may be constructed based at least in part on content in the reference (target) set of content.

In some embodiments, the reference and target knowledge representations may be merged to create a merged knowledge representation and one or more terms associated with a user's search query (and, optionally, terms appearing in the user context information associated with the user) may be used to identify or synthesize one or more concepts in the merged knowledge representation that are semantically relevant to the term(s) associated with the user's search query and, optionally, terms appearing in the user context information associated with the user. In turn, the obtained concepts may be used to augment the user's search query with terms associated with the obtained concepts prior to conducting the search. Accordingly, concepts obtained based at least in part on the reference knowledge representation may be used to improve the quality of search results returned in response to users' search queries for content in a target set of content.

It should be appreciated that the various aspects of the present invention described herein may be implemented in any of numerous ways, and are not limited to any particular implementation technique. Examples of specific implementations are described below for illustrative purposes only, but aspects of the invention described herein are not limited to these illustrative implementations. Additionally, unless it clearly appears otherwise from the particular context, it is intended that the various features and steps described herein may be combined in ways other than the specific example embodiments depicted and that such other combinations are within the scope of the disclosure and are contemplated as inventive.

FIG. 1 is a flow chart of an illustrative process 100 for providing a user with digital content selected from a large set of digital content based on a knowledge representation that may be used in some embodiments. The process of FIG. 1 begins at act 102, where user context information associated with one or more users may be obtained. As described in greater detail below, user context information may be any suitable information associated with the user(s) and/or provided by the user(s). The manner in which user context information is obtained is also described in greater detail below.

Process 100 then continues to act 104, where an active concept representing at least a portion of the user-context information may be identified in a knowledge representation. The knowledge representation may be any suitable knowledge representation and, in some embodiments, may be a user-specific knowledge representation associated with the user(s). Though, it should be recognized that the knowledge representation is not limited to being a user-specific knowledge representation and may be any other knowledge representation available to process 100. In some embodiments, as part of act 104, an active concept representing the user context information may be generated, for subsequent use in constructing a user-specific knowledge representation comprising the active concept.

Process 100 then continues to act 106, where one or more concepts semantically relevant to the active concept may be obtained by using the knowledge representation comprising the active concept. (Example relevance measures are discussed below.) Process 100 then continues to act 108, where one or more of the obtained concept(s) may be selected. The concept(s) may be selected based at least in part on a score that one or more of the concept(s) may be assigned by using a relevance measure. Process 100 then proceeds to act 110, where content may be provided to the one or more users based at least in part on the active concept, identified or generated in act 104, and the concept(s) selected in act 108. Such content may be selected from a large set of content by using the active concept and the concept(s) selected in act 108. Each of the acts of the process of FIG. 1 may be performed in any of a variety of ways, and some examples of the ways in which these acts may be performed in various embodiments are described in greater detail below.

Process 100 and any of its variants may be implemented using hardware, software or any suitable combination thereof. When implemented in software, the software may execute on any suitable processor or collection of processors, whether stand-alone or networked. The software may be stored as processor-executable instructions and configuration parameters; such software may be stored on one or more non-transitory, tangible computer-readable storage media.

Software implementing process 100 may be organized in any suitable manner. For example, it may be organized as a software system comprising one or more software modules such that each software module may perform at least a part of one or more acts of process 100. Though, in some embodiments, one or more software modules of such a software system may perform functions not related to acts of process 100, as aspects of the present invention are not limited in this respect.

I. Obtaining User Context Information

As discussed above, at act 102 of process 100, user context information associated with one or more users may be obtained. User context information may comprise any information that may be used to identify what information the user(s) may be seeking and/or may be interested in. User context information may also comprise information that may be used to develop a model of the user(s) that may be subsequently used to provide those user(s) with information. As such, user context information may include, but is not limited to, any suitable information related to the user(s) that may be collected from any available sources and/or any suitable information directly provided by the user(s).

In some embodiments, information related to a user may be any suitable information about the user. For example, information related to a user may comprise demographic information (e.g., gender, age group, education level, etc.) associated with the user. As another example, information related to a user may comprise details of the user's Internet browsing history. Such information may comprise a list of one or more websites that the user may have browsed, the time of any such browsing, and/or the place (i.e., geographic location) from where any such browsing occurred. The user's browsing history may further comprise information that the user searched for and any associated browsing information including, but not limited to, the search results the user obtained in response to any such searches.

As another example, information related to a user may comprise any information that the user has provided via any user interface on the user's computing device or on one or more websites that the user may have browsed. For instance, information related to a user may comprise any information associated with the user on any website such as a social networking website, job posting website, a blog, a discussion thread, etc. Such information may include, but is not limited to, the user's profile on the website, any information associated with multimedia (e.g., images, videos, etc.) corresponding to the user's profile, and any other information entered by the user on the website. As yet another example, information related to a user may comprise consumer interaction information as described in U.S. patent application Ser. No. 12/555,293, filed Sep. 8, 2009, and entitled "Synthesizing Messaging Using Content Provided by Consumers," which is incorporated herein by reference.

In some embodiments, information related to a user may comprise geo-spatial information. For instance, the geo-spatial information may comprise the current location of the user and/or a computing device of the user (e.g., user's home, library in user's hometown, user's work place, a place to which the user has traveled, and/or the geographical location of the user's device as determined by the user's Internet IP address, etc.). Geo-spatial information may include an association between information about the location of the user's computing device and any content that the user was searching or viewing when the user's computing device was at or near that location. In some embodiments, information related to a user may comprise temporal information. For example, the temporal information may comprise the time during which a user was querying or viewing specific content on a computing device. The time may be specified at any suitable scale such as on the scale of years, seasons, months, weeks, days, hours, minutes, seconds, etc.

Additionally or alternatively, user context information associated with one or more users may comprise information provided by the user(s). Such information may be any suitable information indicative of what information the user(s) may be interested in. For example, user context information may comprise one or more user search queries input by a user into a search engine (e.g., an Internet search engine, a search engine adapted for searching a particular domain such as a corporate intranet, etc.). As another example, user context information may comprise one or more user-specified indicators of the type of information the user may be interested in. A user may provide the indicator(s) in any of numerous ways. The user may type in or speak an indication of his preferences, select one or more options provided by a website or an application (e.g., select an item from a dropdown menu, check a box, etc.), highlight or otherwise select a portion of the content of interest to the user on a website or in an application, and/or in any other suitable manner. For example, the user may select one or more options on a website to indicate that he wishes to receive news updates related to a certain topic or topics, advertisements relating to one or more types of product(s), information about updates on any of numerous types of websites, newsletters, e-mail digests, etc.

Figure 2:
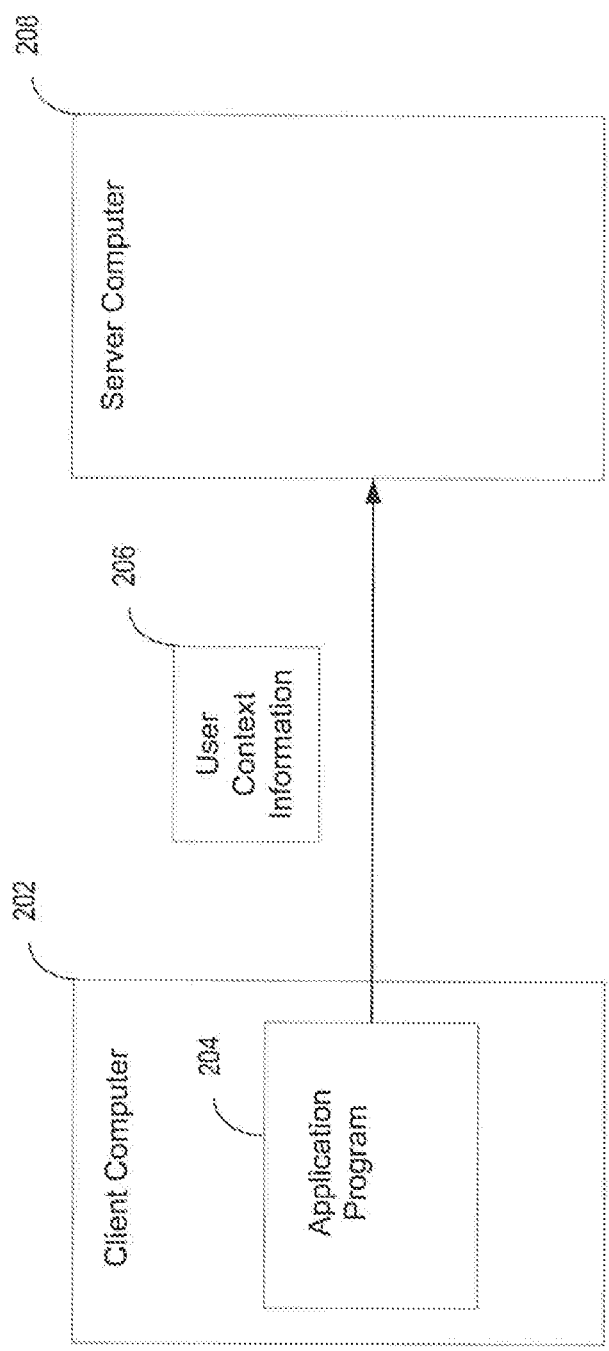
FIG. 2 is a block diagram of an illustrative client/server architecture that may be used to implement some embodiments of the present disclosure.

The user context information may be obtained, in act 102, in any of a variety of possible ways. For example, in some embodiments, the user context information may be provided from a user's client computer to one or more server computers that execute software code that performs process 100. That is, for example, as shown in FIG. 2, a user may operate a client computer 202 that executes an application program 204. Application program 204 may send user context information 206 (e.g., a search query entered by the user into application program 204) to server computer 208, which may be a computer that performs process 100. Thus, server 208 may receive user context information 206 from application program 204 executing on client 202.

Application program 204 may be any of a variety of types of application programs that are capable of, directly or indirectly, sending information to and receiving information from server 208. For example, in some embodiments, application program 204 may be an Internet or WWW browser, an instant messaging client, or any other suitable application.

In the example of FIG. 2, application program 204 is shown as sending the user context information directly to server 208. It should be recognized that this is a simplified representation of how the user context information may be sent from client 202 to server 208, and that the user context information need not be sent directly from client 202 to server 208. For example, in some embodiments, the user's search query may be sent to server 208 via a network. The network may be any suitable type of network such as a LAN, WAN, the Internet, or a combination of networks.

It should also be recognized that receiving user context information from a user's client computer is not a limiting aspect of the present invention as user context information may be obtained in any other suitable way as part of act 102 of process 100. For example, user context information may be obtained, actively by requesting and/or passively by receiving, from any source with, or with access to, user context information associated with one or more users.

Figure 3:
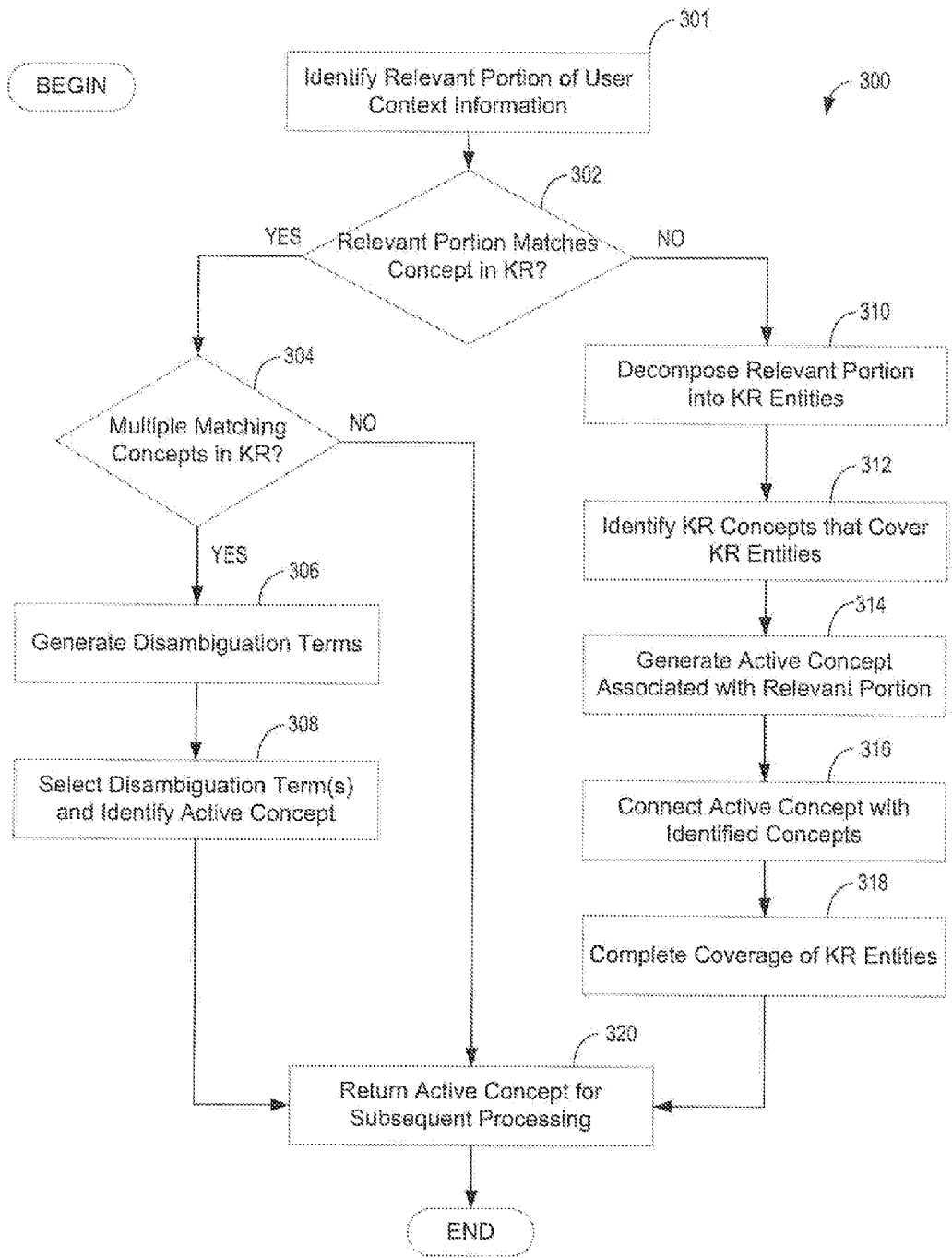
FIG. 3 is a flowchart of an illustrative process for identifying or generating an active concept representing user context information, in accordance with some embodiments of the present disclosure.

II. Identifying or Generating Active Concept Representing User Context Information As discussed above, at act 104 of process 100, an active concept, representing at least a portion of the user-context information obtained during act 102, may be either identified in a knowledge representation, which may be a user-specific knowledge representation or any other suitable knowledge representation, or generated and used to construct a user-specific knowledge representation comprising the active concept. Any of a variety of possible techniques may be used to identify or generate an active concept representing user context information. An example of one such technique that may be used in some embodiments is illustrated in process 300 of FIG. 3.

Process 300 begins at act 301, where a relevant portion of the user context information may be identified. As previously discussed, user context information may comprise any of numerous types of information including, but not limited to, information about a user (e.g., profile of the user on a website, the user's browsing history, etc.) and information provided by a user (e.g., a search query). Accordingly, various portions of the user context information may be used in different scenarios. For example, when a user is searching for information, a relevant portion of the user context information may comprise a user's search query, but also may comprise additional information that may be helpful in searching for the information that the user seeks (e.g., the user's current location, the user's browsing history, etc.). As another example, when presenting a user with one or more advertisements, a relevant portion of the user context information may comprise information indicative of one or more products that the user may have interest in. As another example, when providing a user with news articles (or any other suitable type of content), a relevant portion of the user context information may comprise information indicative of the user's interests. The relevant portion of the user context information obtained (e.g., in act 102) may be identified in any suitable way as the manner in which the relevant portion of the user context information is identified is not a limitation of aspects of the present invention. It should be also recognized that, in some instances, the relevant portion of the user context information may comprise a subset of the user context information, but, in other embodiments, the relevant portion may comprise all of the user context information, as aspects of the present invention are not limited in this respect.

The relevant portion of the user context information, identified in act 301, may be represented in any of numerous ways. For example, in some embodiments, the relevant portion of user context information may be represented via one or more alphanumeric strings. An alphanumeric string may comprise any suitable number of characters (including spaces), words, numbers, and/or any of numerous other symbols. An alphanumeric string may, for example, represent a user search query and/or any suitable information indicative of what information the user may be interested in. Though, it should be recognized that any of numerous other data structures may be used to represent user context information and/or any portion thereof.

Next, process 300 proceeds to decision block 302, where it is determined whether the relevant portion of the user context information associated with a particular user matches a concept in a knowledge representation. Any suitable knowledge representation may be used. In some instances, a user-specific knowledge representation associated with the user or a group of users that includes the user may be used. However, any other suitable knowledge representation may be used and, for example, a knowledge representation not adapted to any particular user or users may be employed.

In some embodiments, the knowledge representation used may be a semantic network. Though, in other embodiments, any of other numerous types of knowledge representations may be employed (e.g., a non-graphical knowledge representation). The knowledge representation may be constructed and/or obtained in any suitable way, as the manner in which the knowledge representation is constructed and/or obtained is not a limitation of aspects of the described methods and systems.

Regardless of which knowledge representation is used in decision block 302, the determination of whether the relevant portion of the user context information matches a concept in the knowledge representation may be made in any suitable way. In some embodiments, the relevant portion of the user context information may be compared with a concept identifier. For example, when the relevant portion of the user context information is represented by an alphanumeric string, the alphanumeric string may be compared with a string identifying the concept (sometimes referred to as a "concept label") to determine whether or not there is a match. The match may be an exact match between the strings, or a substantially exact match in which all words, with the exception of a particular set of words (e.g., words such as "and," "the," "of," etc.), must be matched. Moreover, in some embodiments, the order of words in the strings may be ignored. For instance, it may be determined that the string "The Board of Directors," matches the concept label "Board Directors" as well as the concept label "Directors Board."

If it is determined, in decision block 302, that the relevant portion of the user context information matches a concept in the knowledge representation, process 300 proceeds to decision block 304, where it is determined whether there are multiple concepts in the knowledge representation matching the relevant portion. For example, the selected portion of the user context information may be an alphanumeric string "bark" indicating that the user may be interested in information about "bark." However, it may not be clear whether the user is interested in information about the bark of a dog or the bark of a tree; there may be concepts associated to each such concept in the knowledge representation.

If it is determined, in decision block 304, that there is only one concept, in the knowledge representation matching the relevant portion of the user context information, the one concept is identified as the active concept and process 300 proceeds via the NO branch to act 320 where the active process is returned for subsequent processing, for example, as described in greater detail below with reference to acts 106-110 of process 100.

On the other hand, if it is determined that there are multiple concepts in the knowledge representation matching the relevant portion of the user context information, process 300 continues via the YES branch to acts 306-308, where one of the matching concepts may be selected as the active concept. This may be done in any suitable way. In some embodiments, one of the multiple matching concepts may be selected by using a disambiguation process.

Any suitable disambiguation process may be employed to identify an active concept among the multiple concepts matching the relevant portion of the user context information. Such a disambiguation process may comprise using one or more disambiguation terms to identify the active concept among the multiple concepts such that the identified active concept is likely to represent information that the user may be interested in. The disambiguation process may comprise generating a set of candidate disambiguation terms and selecting one or more candidate disambiguation terms to use for identifying the active concept. For example, a set of candidate disambiguation terms, including the terms "dog" and "tree," may be generated. Subsequent selection of the disambiguation term "dog", which may be performed either automatically or based at least in part on user input, may indicate that the user is interested in information about "dog barking." As such, the selected disambiguation terms may be used for semantically disambiguating among the multiple concepts identified in act 304 to identify the active concept.

Accordingly, in act 306, a set of candidate disambiguation terms may be generated. This may be done in any suitable way. For example, the set of candidate disambiguation terms may comprise one or more keywords, morphemes, and/or any other suitable knowledge representation entities of one or more concepts among the multiple concepts matching the relevant portion of the user context information. Additionally, the set of candidate disambiguation terms may comprise one or more keywords, morphemes, and/or any other suitable KR entities of any concepts connected, within a predetermined degree of separation in the semantic network, to a concept among the multiple concepts. Any suitable degree of separation (e.g., one, two, three, four, five, etc.) may be used. In some embodiments, the set of candidate disambiguation terms may not comprise any of the terms in the relevant portion of the user context information, though in other embodiments, the set of candidate disambiguation terms may comprise one or more terms in the relevant portion of the user context information.

Next, process 300 proceeds to act 308, where one or more of the candidate disambiguation terms may be selected. The selection may be performed in any suitable way and may be performed automatically and/or may involve obtaining one or more disambiguation terms based on user input. For example, in some embodiments, one or more candidate disambiguation terms may be provided to the user, such that the user may select those terms that are indicative of what the user is interested in. The candidate disambiguation terms may be provided to the user in any of a variety of possible ways. For example, in some embodiments, the terms may be provided from server 208 (i.e., the computer that performs process 100) to the application program 204 on client 202 from which the user context information may have been obtained. In embodiments in which application program 204 is an intranet or WWW browser, the terms may be provided in the form of a web page. As such, the user may select one or more terms to indicate the type of information that the user may be interested in.

Regardless of the manner in which one or more candidate disambiguation terms may be provided to a user, user input comprising a selection of one or more disambiguation terms may be received as part of act 308 of process 300. For example, application program 204 that received the set of candidate disambiguation terms generated in act 306 may accept input from the user selecting one or more of the terms, and may send an indication of the user-selected term(s) to the server executing process 100.

In some embodiments, one or more disambiguation terms may be selected automatically from the set of candidate disambiguation terms, without requiring any user input. For example, one or more terms from the set of candidate disambiguation terms, generated in act 306, may be selected based on user context information (e.g., the user's browsing history, online profile, user selected preferences, or any other type of user context information described earlier). Consider, for example, a situation in which a user is searching for "bark," but that it is clear from the user's browsing history that the user has shown interest in information about dogs. In this case, it is likely that the user is searching for information about a "dog bark" rather than "tree bark." Accordingly, the user context information may be used to select the term "dog" from the set of candidate disambiguation terms {"dog" and "tree"}. As another example, the user's online profile on a social networking website may indicate that the user is an avid botanist (or geo-spatial information associated with the user indicates that the user is located in a rainforest), in which case it is likely that the user is searching for information about "tree bark" rather than "dog bark." Though it should be recognized that the above described techniques for selecting disambiguation terms are merely illustrative as the disambiguation terms may be selected in any other suitable manner.

Regardless of the manner in which one or more disambiguation terms may be obtained, in act 308, the obtained terms may be used to identify an active concept among the multiple concepts matching the relevant portion of the user context information. Accordingly, the identified active concept may represent information in which one or more users may be interested. After the active concept is identified, in act 308, process 300 proceeds to act 320 where the active process is returned for subsequent processing and process 300 completes.

Consider, again, decision block 302 of process 300. If it is determined in decision block 302 that the relevant portion of the user context information does not match any concept in the knowledge representation (the NO output branch), process 300 proceeds to act 310, where the relevant portion of the user context information may be decomposed into one or more knowledge representation entities. For example, the relevant portion of the user context information may be decomposed into individual concepts, keywords, and/or morphemes. This may be done in any suitable way. For example, when the portion of the user context information is represented by an alphanumeric string, the string may be tokenized or separated into more elemental knowledge representation entities. Stop words such as "the" and "and" may be filtered out or ignored. For example, if the alphanumeric string is a user's search query "The BP Board of Directors," the query may be tokenized into the following entities: "Board of Directors," "BP Board," "BP Directors," "BP", "Board," and "Directors." It should be recognized that many other techniques may be applied to separating the relevant portion of the user context information into knowledge representation entities including the semantic analysis methods described in U.S. patent application Ser. No. 13/165,423, filed Jun. 21, 2011, and titled "Systems and Methods for Analyzing and Synthesizing Complex Knowledge Representations," which is incorporated herein by reference.

Process 300 continues to act 312, where concepts in the knowledge representation that cover the KR entities, which were derived in act 310, are identified. This may be done in any suitable way and, for example, may be done by comparing each of the KR entities with concepts in the KR to see if there is a match. In some embodiments, a string associated with a KR entity may be compared with labels of concepts in the KR. For example, consider semantic network 401 shown in FIG. 4A comprising concepts 402 and 406 labeled "Board of Directors" and "Board," respectively. Concepts 402 and 406 are connected by a "defined-by" edge 404. Though not explicitly shown, the node associated with the concept labeled "Board of Directors" may also be connected via a "defined-by" edge to a node associated with the concept labeled "Director." Accordingly, nodes existing in semantic network 401 cover KR entities "Board of Directors," "Directors," and "Board." Note that these KR entities were derived from the alphanumeric string "BP Board of Directors" in act 310 of process 300. Note that semantic network 401 does not include a concept with the label "BP Board of Directors."

Figure 4A:
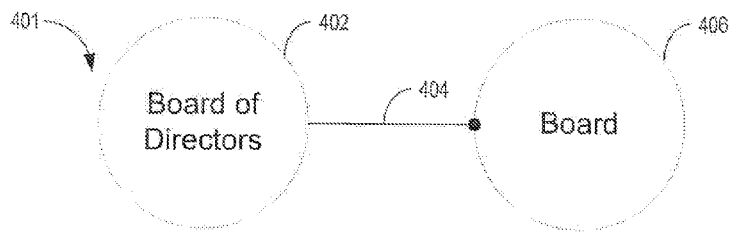
FIGS. 4A-4C illustrate generating an active concept representing user context information, in accordance with some embodiments of the present disclosure.
Figure 4B:
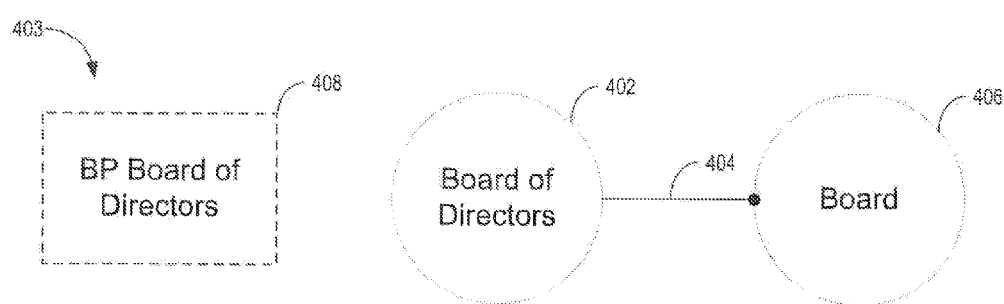

Process 300 next continues to acts 314-318, where an active concept corresponding to the relevant portion of the user context information may be generated and, subsequently, used to construct a user-specific knowledge representation comprising the active concept. First, in act 314, an active concept associated with the relevant portion of the user context information may be generated. This may be done in any suitable way. For example, a new node may be added to the knowledge representation and may be associated with the relevant portion of the user context information. As such, the node may be assigned an identifier (i.e., a concept label) comprising the relevant portion of the user context information. For example, as shown in FIG. 4B, node 408 associated with the generated active concept and labeled "BP Board of Directors" was added to semantic network 401 to form semantic network 403. In this and other diagrams of semantic networks, the node corresponding to an active concept may be indicated by a rectangle.

Next, as part of act 316, the new node may be connected by one or more new edges to one or more concepts already present in the knowledge representation. The new node, representing the generated active concept, may be connected to any suitable concepts in the knowledge representation and, for example, may be connected to one or more concepts in the knowledge representation that cover the knowledge representation entities derived from the relevant portion of the user context information. Thus, in the "BP Board of Directors" example, node 408 may be connected to the node associated with the concept "Board of Directors," to the node associated with the concept "Board," and/or to the node associated with the concept "Directors."

In some embodiments, the new node may be connected to nodes associated with the most complex concepts that cover the KR entities derived in act 310. Complexity of a concept may be defined in any of numerous ways. For example, complexity of a concept may be indicative of the number of other concepts that are "defined-by" the concept; the greater the number of concepts "defined-by" the concept, the greater its complexity. Thus, complexity of a concept may be proportional to the number of outgoing "defined-by" edges from the node corresponding to that concept. In semantic network 401, for example, the concept "Board of Directors" has a greater complexity than the concept "Board." As another example, complexity of a concept may be indicative of the number of words in the label of the concept; the greater the number of words, the greater its complexity. Thus, complexity of a concept may be proportional to the number of words in the concept label. In this case, the concept "Board of Directors" also has a greater complexity than the concept "Board." Accordingly, node 408, associated with the concept "BP Board of Directors," is connected, in semantic network 405, by a new "defined-by" edge 410 to node 402, corresponding to the "Board of Directors" concept.

Figure 4C:
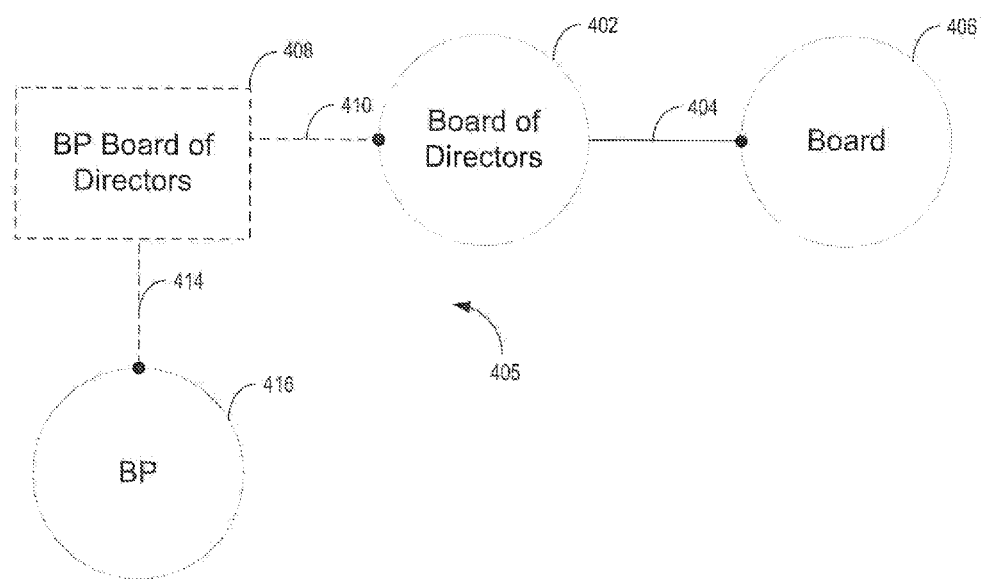

Finally, in act 318, the knowledge representation may be further augmented such that the knowledge representation includes concepts that may cover all of the KR entities derived from the relevant portion of the user context information in act 310. To this end, a new node may be added to the knowledge representation for each KR entity derived in act 310 but not covered by a concept already in the knowledge representation. Each such new node may be connected to one or more concepts existing in the knowledge representation and, for example, may be connected via a "defined-by" edge to the concept associated with the generated active concept. For example, the keyword "BP" was derived from the new "BP Board of Directors" concept, but is not covered by any of the concepts in semantic networks 401 or 403. Thus, as shown in FIG. 4C, node 416 associated with the concept "BP" may be added to the knowledge representation in act 318 and may be connected to node 408, associated with the active concept, via a "defined-by" edge 414.

Thus, a new user-specific knowledge representation is created after acts 314-318 have been executed. The created knowledge representation is user-specific because it comprises one or more concepts derived from user context information associated with one or more users and the knowledge representation used in act 302. In the examples of FIGS. 4A-4C, semantic network 405 was created by incorporating two concepts (i.e., "BP" and "BP Board of Directors" obtained from user context information) into semantic network 401. Though, it should be recognized that the examples of FIGS. 4A-4C are merely illustrative and are not limiting on aspects of the present invention. Next, process 300 continues to act 320, where the active concept generated in acts 314-318 may be provided for subsequent processing, and after act 320, process 300 completes.

It should be appreciated that after the user-specific knowledge representation is created, it may be stored such that it may be subsequently used in any processing associated with the one or more users. For example, the user-specific knowledge representation may be used and/or updated anytime processes 100 or 300 may be executed in connection with the user(s). The user-specific knowledge representation may be stored in any suitable way and, for example, may be stored using one or more non-transitory, tangible computer-readable storage media of any suitable type.

III. Identify Concepts Relevant to Active Concept

As discussed above, at act 106 of process 100, one or more concepts relevant to the active concept may be obtained by using a knowledge representation comprising the active concept. The knowledge representation may be any suitable knowledge representation and, in some instances, may be a user-specific knowledge representation associated with the user(s) whose context information was obtained in act 102 of process 100. The active concept may be any suitable concept in the knowledge representation and may be identified based at least in part on the user context information, for instance, by using process 300, or in any other suitable way.

In some embodiments, one or more concepts relevant to the active concept may be obtained based at least in part on the structure of the knowledge representation comprising the active concept. For example, when the knowledge representation is a semantic network, one or more concepts relevant to the active concept may be obtained based at least in part on the structure of the graph that represents the semantic network. Any of numerous aspects of the graph structure may be used including, but not limited to, the directionality of the edges representing semantic relationships between concepts and whether the semantic relationships are "defined-by" relationships or "is-a" relationships. Additionally or alternatively, the structure of the graph may be used to synthesize one or more new concepts, not initially in the semantic network, that may be relevant to the active concept. In this case, any of the synthesized concepts may be used to augment the semantic network.

Any of numerous techniques for obtaining concepts relevant to the active concept based on the graph structure of the semantic network comprising the active concept may be used in act 106 of process 100. In some embodiments, concepts relevant to the active concept may be obtained by performing one or more types of operations with respect to the graph structure of the semantic network. Three such operations, namely: (1) retrieval, (2) addition, and (3) substitution, are described in greater detail below. These three operations are merely illustrative, however, and any other suitable operations for identifying concepts relevant to the active concept, based at least in part on the graph structure of the semantic network, may be used. For brevity, in the description of the operations that follows, no explicit distinction is made between a node in a graph used to represent a concept and the concept itself. Thus, an edge between two concepts corresponds to an edge between the nodes in the semantic graph used to represent those two concepts.

A retrieval operation may be used to identify concepts in the semantic network that are relevant to the active concept. In some embodiments, the retrieval operation may be used to identify concepts that were represented in the semantic network before the active concept was identified and/or generated. Though, in other embodiments, the retrieval operation may be used to identify concepts that were added to the semantic network when the active concept was generated (e.g., in act 318 of process 300).

In some embodiments, the retrieval operation may identify a concept that is connected by one or more edges, of any suitable type and/or direction, to the active concept as a concept relevant to the active concept. For example, the retrieval operation may identify a concept that is connected by one or more "is-a" edges to the active concept as a concept relevant to the active concept. As a specific example, the retrieval operation may identify a concept that has outgoing "is-a" edge towards the active concept or a concept that has an incoming "is-a" edge from the active concept as a concept relevant to the active concept.

Figures 5E, 5F:
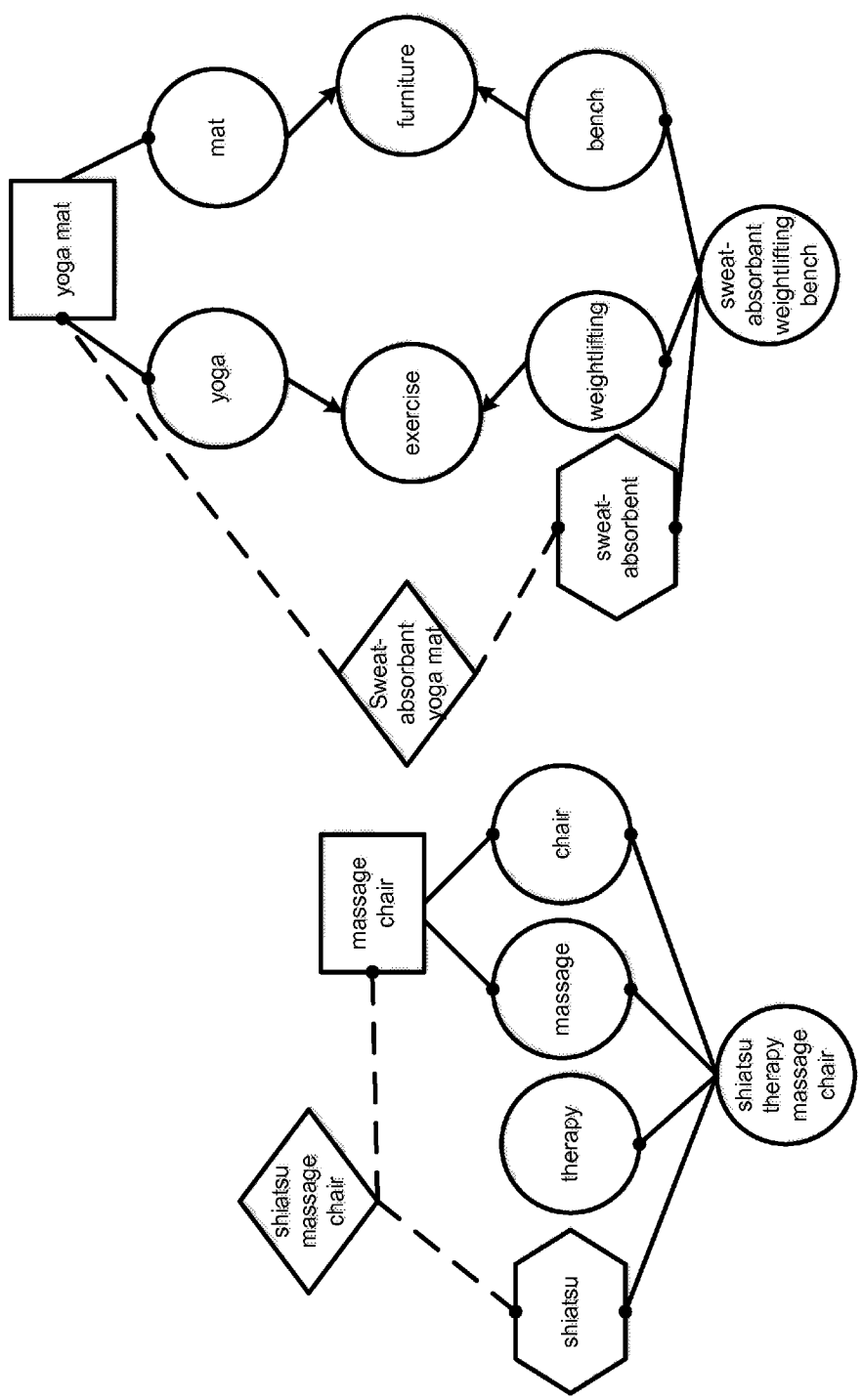

A simple example of a retrieval operation is illustrated in FIG. 5A, which shows a semantic network comprising the active concept "press" (that the concept "press" is active is indicated here by a rectangle) and another concept "push press." The concept "push press" is connected to the active concept via an outgoing "is-a" relationship. Accordingly, a retrieval operation may be used to identify the concept "push press" as a concept relevant to the active concept. Note that in FIGS. 5A-5H, the concepts identified as concepts relevant to the active concept are indicated by a diamond.

In contrast to the retrieval operation, which may be used to obtain concepts relevant to the active concept among the concepts already in the semantic network, the addition and substitution operations described below may be used to obtain concepts relevant to the active concept by synthesizing new concepts based at least in part on the active concept and on the concepts in the semantic network. Note that in FIGS. 5B-5H, concepts added to the active concept to synthesize a new concept are indicated by a hexagon.

An addition operation may synthesize a new concept by using the active concept and at least one other concept in the semantic network, and return the new concept as a concept relevant to the active concept. The new concept may be synthesized using any of numerous techniques including at least: (1) attribute co-definition, (2) analogy-by-parent, (3) analogy-by-sibling, (4) attribute commonality or any suitable combination thereof.

In some embodiments, an addition operation may be used to synthesize a new concept by using the attribute co-definition technique. A first concept in a semantic network is an attribute of a second concept in the semantic network if the first concept defines the second concept. This may be ascertained from the graph representing the semantic network if there is an outgoing "defined-by" edge from the second concept to the first concept. For example, as shown in FIG. 5B, the concepts "bench," "press," and "sets" are attributes of the concept "bench press sets," and the concepts "press" and "sets" are attributes of the concept "press sets." If the active concept is an attribute of (i.e., is connected via an outgoing "defined by" edge to) a first concept, and the first concept has one or more other concepts as an attribute, it may be said that the active concept and the other concept(s) co-define the first concept. For example, in FIG. 5B, "press" is the active concept and, the concepts "press," "bench," and "sets" co-define the concept "bench press sets."

In the attribute co-definition technique, a new concept may be synthesized by combining the active concept with any of the other concepts co-defining a concept with the active concept. For example, as shown in FIG. 5B, the concept "press sets" may be synthesized by combining "press" and "sets." As another example (not shown in FIG. 5B), the concept "bench press" may be synthesized by combining "press" and "bench."

In some embodiments, an addition operation may be used to synthesize a new concept by using the analogy-by-parent technique. In a semantic network, a first concept with an outgoing "is-a" edge to a second concept may be considered as a child concept of the second concept. Stated differently, the second concept may be considered to be a parent concept of the first concept. For example, in FIG. 5C, the concept "seat" is a parent concept of the active concept "recliner." The analogy-by-parent technique is motivated by the idea that an attribute that co-defines a concept with a parent of the active concept may be relevant to the active concept. Stated more plainly, something relevant to the parent may be relevant to the child.

Accordingly, in the analogy-by-parent technique, a new concept may be synthesized by using the active concept and any second concept that, together with the parent of the active concept, co-defines (or partially co-defines) a third concept. For example, in FIG. 5C, the concept "seat," which is the parent concept of "recliner," and "toilet" together co-define the concept "toilet seat." Thus, the concept "toilet" co-defines another concept with and, as such, may be deemed relevant to a parent of the active concept. Accordingly, the active concept "recliner" and the concept "toilet" may be used to synthesize a new concept "recliner toilet."

In some embodiments, an addition operation may be used to synthesize a new concept by using the analogy-by-sibling technique. In a semantic network, any two concepts with outgoing "is-a" edges ending at a common (parent) concept may be considered siblings of one another. For example, in FIG. 5D, the concepts "chair" and "recliner" may be considered as siblings. The analogy-by-parent technique is motivated by the idea that an attribute that co-defines a concept with a sibling of the active concept may be relevant to the active concept. Stated more plainly, something relevant to one sibling may be relevant to another sibling.

Accordingly, in the analogy-by-parent technique, a new concept may be synthesized by using the active concept and any second concept that, together with the sibling of the active concept, co-defines (or partially co-defines) a third concept. For example, in FIG. 5D, the concept "chair," which is a sibling of the active concept "recliner," and "massage" together co-define the concept "massage chair." Thus, the concept "massage" co-defines another concept with and, as such, may be deemed relevant to, the sibling concept "chair." Accordingly, the active concept "recliner" and the concept "massage" may be used to synthesize a new concept "massage recliner."

It should be recognized that the terms "parents" and "siblings" are used to provide intuition behind some of the above-described operations and that, in some embodiments, such as an atomic knowledge representation model, concepts may not include literal "parent" and "sibling" relationships. The terms "siblings" and "parents" suggest a taxonomy structure in a complex knowledge representation. In contrast, in some embodiments, an atomic knowledge representation model may include only "is-a" and "defined-by" relations.

In some embodiments, an addition operation may be used to synthesize a new concept by using the attribute commonality technique. In a semantic network, two concepts may be said to exhibit "attribute commonality" if the concepts share one or more attributes with one another. For example, as shown in FIG. 5E, the concept "massage chair" and "shiatsu therapy massage chair" share the attributes "massage" and "chair," and, as such, may be said to exhibit attribute commonality. The attribute commonality technique is motivated by the idea that if a first concept shares one or more attributes with a second concept, then any other attributes of the second concept may be relevant to the first concept.

Accordingly, in the attribute commonality technique, a new concept may be synthesized by using the active concept and any attribute of a second concept that shares one or more attributes with the active concept. For example, as shown in FIG. 5E, the active concept "massage chair" and "shiatsu," which is an attribute of the concept "shiatsu therapy massage chair" that has attribute commonality with "massage chair," may be used to synthesize a new concept "shiatsu massage chair." As another example, not shown in FIG. 5E, the active concept "massage chair" and "therapy," may be used to synthesize a new concept "massage therapy chair."

In some embodiments, the attribute commonality technique may comprise generating a new concept by using the active concept and another concept identified by using at least one "is-a" bridge. In a semantic network, two concepts are connected via an "is-a" bridge if they both share outgoing "is-a" edges terminating at a common (parent) concept. For example, in FIG. 5F, the concepts "yoga" and "weightlifting" are connected via an "is-a" bridge to the concept "exercise." Also, the concepts "mat" and "bench" are connected via an "is-a" bridge to the concept "furniture."

In the attribute commonality technique, a new concept may be synthesized by using the active concept and a second concept that has an attribute connected to an attribute of the active concept via an "is-a" bridge. In some instances, the new concept may be synthesized by using the active concept and any attribute of the second concept that is not connected to an attribute of the active concept via an "is-a" bridge. For example, as shown in FIG. 5F, the active concept "yoga mat" has "yoga" and "mat" as its attributes. Each of these attributes is connected with an attribute of the concept "sweat-absorbent weightlifting bench." Accordingly, the active concept "yoga mat" and the attribute "sweat-absorbent" may be used to synthesize a new concept "sweat-absorbent yoga mat."

The above-described techniques for performing an addition operation comprise synthesizing a new concept, as a concept that may be relevant to the active concept, by combining the active concept with another concept. As a result, the synthesized concept may be a less general or "narrower" concept than the active concept. However, it should be recognized that, concepts relevant to the active concept need not be less general than the active concept and, indeed, may be more general or "broader" concepts than the active concept.

Accordingly, in some embodiments, one or more attributes of the active concept may be pruned in order to produce a candidate that is more general than the active concept. This may be done in any suitable way. For instance, attributes may be pruned by performing an "inverse" addition operation, wherein an attribute of the active concept may be removed if, according to any of the above-described techniques, that attribute may be combined with the "broader" concept that results from the pruning. For example, if in the semantic network shown in FIG. 5E, the concept "shiatsu massage chair" was an active concept and the concept "massage chair" was not in the network, then the concept "massage chair" may be created by pruning the attribute "shiatsu." Although, in some embodiments, any suitable attribute may be pruned so long as the resulting concept is not in the semantic network. For example, the attribute "massage" may be pruned resulting in the concept "shiatsu chair."

Another operation that may be used to obtain one or more concepts relevant to the active concept is the substitution operation. The substitution operation may be used to synthesize a new concept by replacing one or more attributes of the active concept with another concept, which may be a broader or a narrower concept than the attribute that it replaces. To perform a substitution, either a retrieval or an addition operation may be performed on one or more attributes of the active concept. The concept identified or generated by the retrieval or addition operations, respectively, when performed on a specific attribute of the active concept, may be used to replace the specific attribute to synthesize a new concept.

Consider, for example, the semantic network shown in FIG. 5G comprising the active concept "strict press" having attributes "strict" and "press." As previously described with reference to FIG. 5A, a retrieval operation performed on the attribute "press" may be used to identify the (narrower) concept "push press." According to the substitution technique, this narrower concept ("push press") may be combined with any attribute or attributes of the active concept (other than the attribute from which the narrower concept was derived) to synthesize a new concept. In this way, the concept "strict push press" may be synthesized. Similarly, a substitution with retrieval operation may be performed to substitute an attribute of the active concept with a concept that is broader than that attribute.

Figures 5G, 5H:
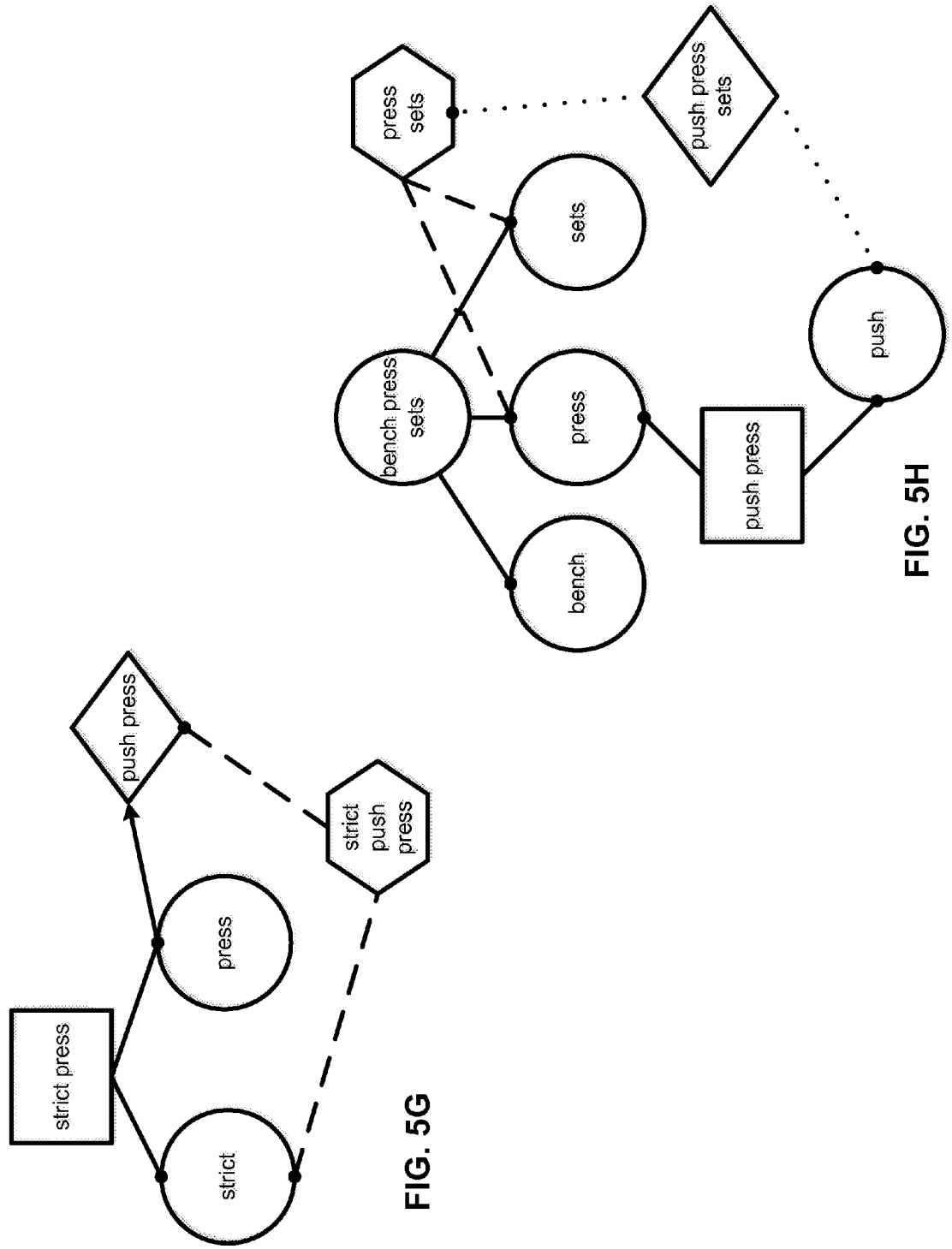

FIG. 5H illustrates performing a substitution operation by using an addition operation based on the attribute co-definition technique. In this example, applying the attribute co-definition technique to the attribute "press" of the active concept "push press" results in the concept "press sets," as previously described with reference to FIG. 5B. Accordingly, the concept "press sets" may be used to replace the attribute "press" in the concept "push press" to synthesize a new concept "push press sets."

In the same vein, substitution operations using any other type of addition operation (e.g., analogy-by-parent, analogyby-sibling, and attribute commonality) on one or more attributes of the active concept may be used to synthesize one or more concepts relevant to the active concept.

IV. Score and Select Identified Concept(s) by Using Relevance Measure or Measures After one or more concepts relevant to the active concept are obtained in act 106, process 100 proceeds to act 108, where the obtained concepts may be scored and a subset of the concepts may be selected for subsequent use based on the calculated scores. Scores associated to the concepts obtained in act 106 may be calculated in any of numerous ways. In some embodiments, the scores may be obtained by using one or more relevance measures indicative of how relevant a concept to be scored may be to the active concept. A relevance measure may be computed based at least in part on the structure of the graph that represents the semantic network containing the concept to be scored and the active concept.

Five measures of relevance are described in greater detail below along with some of their variations, namely: (1) generation certainty, (2) concept productivity, (3) Jaccard (4) statistical coherence, and (5) cosine similarity. Though it should be recognized that these techniques are merely illustrative and that any other suitable techniques for assigning a score to a concept may be used. For example, as described in greater detail below, any of the above techniques may be combined to calculate an integrated score for a concept obtained in act 106.

IV.A Generation Certainty Technique

In the generation certainty technique, concept scores may be calculated based at least in part on the structure of the semantic network comprising the concepts. Recall that any of the concepts obtained in act 106 of process 100 may be in the semantic network or may be added to the semantic network after they are synthesized. The generation certainty score calculated for a particular concept may depend on the structure of the semantic network as well as the locations of the particular concept and the active concept within the semantic network. The score may depend on any of numerous aspects of the structure of the semantic network including, but not limited to, the number of edges in a path between the active concept and the particular concept, the number of nodes in a path between the active concept and the particular concept, the types of edges in a path between the active concept and the particular concept, the types of nodes in a path between the active concept and the particular concept, the directionality of the edges in a path between the active concept and the particular concept, any weights associated with edges in a path between the active concept and the particular concept, and any suitable combination thereof. It should be recognized that the structure of a graph representing the semantic network may be such that there are one or multiple paths between the active concept and a concept to be scored.

In some embodiments, for example, the generation certainty score computed for a particular concept may be inversely proportional to the number of edges and/or nodes separating the active concept and the particular concept in the semantic graph. Accordingly, the score computed for a concept separated by a large number of edges and/or nodes from the active concept may be lower than the score computed for a concept separated by a smaller number of edges and/or nodes from the active concept.

As previously mentioned, in some embodiments, the generation certainty score may be calculated as a function of the weights associated with edges in the semantic network. In particular, the generation certainty score may be calculated as a function of the weights associated with a set of edges in a path between the active concept and the concept being scored.

In this case, the generation certainty score may be calculated by taking a product of the weights of the edges in the path from the active concept to the concept being scored.

A weight may be assigned to an edge in a semantic network in any of numerous ways. In some embodiments, the weight assigned to an edge may be computed based on a measure of certainty associated with traversing that edge. In turn, the amount of certainty associated with traversing an edge may depend on the type of the edge (i.e., is the edge a "defined-by" edge or an "is-a" edge) and/or on the direction of traversal. In some embodiments, the weight assigned to an edge may be a number between 0 and 1, but in other embodiments the weight may be a number in any other suitable range.

For example, traversal of a "defined-by" edge may reduce the certainty associated with traversing the edge by a factor of x, where x may be any suitable number between 0 and 1 and, for example, may be any factor greater than or equal to 0.25, 0.5, 0.75, 0.9, etc. Similarly, traversal of an "is-a" edge may reduce the certainty of traversing the edge by a factor of y, where y may be any suitable number between 0 and 1 and, for example may be any factor greater than or equal to 0.25, 0.5, 0.75, 0.9, etc. In some instances, the factor x may be equal to the factor y, but, in some instances, these factors may be different such that the amount of certainty associated with traversing an edge may depend on the type of edge being traversed.

In some embodiments, the amount of certainty associated with traversing an edge may depend on the directionality of the edge and the direction that the edge may be traversed when traversing that edge in a path from one concept to another. For instance, traveling from concept A to concept B (where A "is-a" B such that there is an outgoing "is-a" edge from the node associated with concept A to the node associated with concept B in the semantic network) may reduce the amount of certainty by one factor (e.g., 0.9) while traveling against the direction of the "is-a" edge may reduce certainty by a different factor (e.g., 0.8).

In some embodiments, the generation certainty score assigned to a concept may depend on whether that concept was obtained by using a retrieval operation (i.e., the concept was already in the semantic network) or obtained by using an addition or substitution operation (i.e., the concept was synthesized). For example, the generation certainty score may be reduced by a factor (e.g., 0.25) when the concept was synthesized.

Figure 6A:
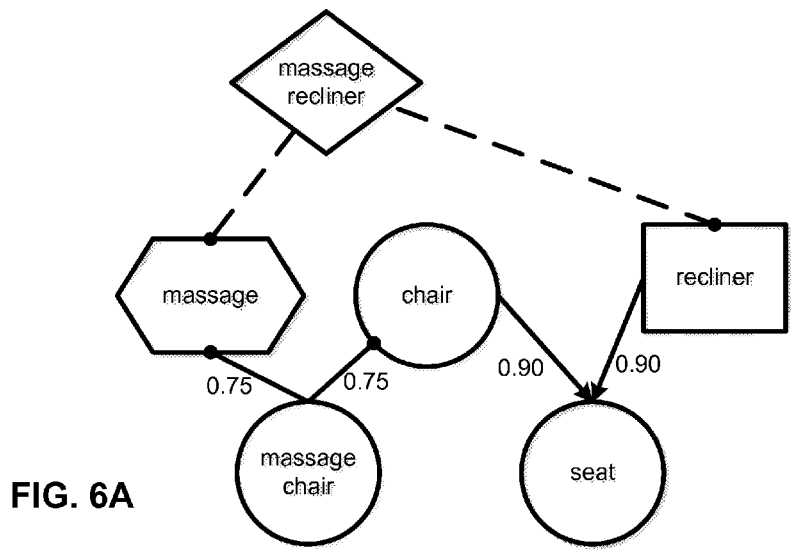
FIGS. 6A-6B illustrate techniques for scoring concepts relevant to an active concept, in accordance with some embodiments of the present disclosure.

One illustrative, non-limiting example of computing a generation certainty score is shown in FIG. 6A. In this case, the generation certainty of the candidate "massage recliner" may be calculated as a product of the weights associated with edges in the path from the active concept "recliner" to the synthesized concept "massage recliner." As shown in FIG. 6A, the weight associated with each of the "defined-by" edges along the path is 0.9 and the weight associated with each of the "is-a" edges along the path is 0.75. Further, since the concept "massage recliner" is a synthesized concept, the overall generating certainty score is adjusted by a factor of 0.25. Thus, the generation certainty score, $S_{gc}$, may be calculated according to:

$$S_{gc} = \text{Edge}_{recliner\text{-}seat} \times \text{Edge}_{seat\text{-}chair} \times$$
$$\text{Edge}_{chair\text{-}massage\ chair} \times \text{Edge}_{massage\ chair\text{-}massage} \times$$
$$\text{Node}_{massage\ recliner}$$
$$= \text{Edge}_{is\text{-}a} \times \text{Edge}_{is\text{-}a} \times \text{Edge}_{defined\text{-}by} \times$$

-continued $$\text{Edge}_{defined-by} \times \text{Node}_{synthesized}$$
$$= 0.9 \times 0.9 \times 0.75 \times 0.75 \times 0.25$$
$$= 0.1139$$

It should also be recognized that, in some embodiments, the numerical values of the weights associated with the edges in a semantic network may be manually assigned (e.g. assigning the weight of 0.9 to an "is-a" edge and a weight of 0.75 to a "defined-by" edge). Additionally or alternatively, the numerical values of the weights may be based on the statistical coherence measures described below and/or calculated as probabilities using the teachings disclosed in U.S. Provisional Application Ser. No. 61/430,810, filed on Jan. 7, 2011, titled "Probabilistic Approach for Synthesis of a Semantic Network"; U.S. Provisional Application Ser. No. 61/430,836, filed on Jan. 7, 2011, titled "Constructing Knowledge Representations Using Atomic Semantics and Probabilistic Model"; and U.S. Provisional Application Ser. No. 61/532,330, filed on Sep. 8, 2011, titled "Systems and Methods for Incorporating User Models and Preferences into Analysis and Synthesis of Complex Knowledge Representation Models," all of which are hereby incorporated by reference in their entireties.

IV.B Concept Productivity Score

In the concept productivity technique, the score of a concept may be calculated based on the number of other concepts in the semantic network that the concept defines. For example, the concept productivity score of a concept may be calculated based on the number of incoming "defined-by" edges that the concept possesses. Some further examples are provided below.

For example, the concept productivity score assigned to a concept obtained by using a retrieval operation (e.g., as described with reference to act 106 of process 100), may be calculated based on the number of concepts the concept defines. For example, the active concept may be "press", which may have an incoming "is-a" relationship with the concept "push press" and an incoming "is-a" relationship with "dumbbell press." As such, both of these concepts may be retrieved as concepts relevant to the active concept in act 106. However, if the number of concepts defined by the concept "push press" is greater than the number of concepts defined by the concept "dumbbell press", then the concept "push press" will be assigned a higher concept productivity score than the concept "dumbbell press."

As another example, the concept productivity score assigned to a concept obtained by using an addition operation (e.g., as described with reference to act 106 of process 100), may be calculated based on the number of concepts defined by the concept to be added to the active concept in order to generate the synthesized concept. For example, the active concept may be "press" and the concepts synthesized by using one of the addition operations may be "press sets" or "press movements." If the number of concepts defined by "movements" is greater than the number of concepts defined by "sets," then the concept "press movements" will be assigned a higher concept productivity score than the concept "press sets."

As another example, the concept productivity score assigned to a concept obtained by using a substitution operation may be calculated based on the number of concepts defined by the concept to be substituted for one of the attributes of the active concept. For example, the active concept may be "push press" and its attribute "press" may be substituted with the concept "press sets" or the concept "press movements." If the number of concepts defined by the concept "press movements" is greater than the number of concepts defined by the concept "press sets," then the synthesized concept "push press movements" will be assigned a higher concept productivity score than the synthesized concept "push press sets."

IV. C Jaccard Score

In the Jaccard score technique, the score of a particular concept may be calculated based on the number of concepts that fall within a particular degree of separation from the active concept as well as within the same degree of separation from the particular concept. For example, when the degree of separation is one, the Jaccard score of a particular concept may be calculated based on the number of neighbors in common between the particular concept and the active concept. In a semantic network, the neighbor of concept A may be any concept sharing any type of edge with concept A. Since, they share an edge, a neighbor of a concept is within a single degree of separation from the concept. In this case, the larger the number of neighbors in common between an active concept and a concept to be scored, the higher the Jaccard score assigned to that concept. As such, the Jaccard score provides an indication of how interconnected two concepts may be in the semantic network, which, in turn, may be an indication of the relevance of the two concepts. Though, it should be recognized that any degree of separation (e.g., one, two, three, four, five, six, seven, etc.) may be employed.

A Jaccard index is a similarity measure for measuring similarity between two sets A and B. In some instances, the Jaccard index may be defined as the size of the intersection of sets A and B divided by the size of the union of the sets A and B, as shown below:

$$J(A, B) = \frac{|A \cap B|}{|A \cup B|}.$$

The Jaccard index may be applied in our case as follows. Let the set A represent the set of concepts that may be neighbors, or may be within a predetermined number of degrees of separation in the semantic network, from the active concept. Let the set B represent the set of concepts that may be neighbors, or may be within a predetermined number of degrees of separation in the semantic network, from the concept to be scored. Thus, the denominator in the above equation represents the total number of concepts that may be neighbors (or may be within a predetermined number of degrees of separation) of the active concept and/or the concept to be scored while the numerator represents the total number of concepts that are both a neighbor (or may be within a predetermined number of degrees of separation) of the active concept and the concept under evaluation. Accordingly, the Jaccard score of a concept may be computed as the Jaccard index.

Figure 6B:
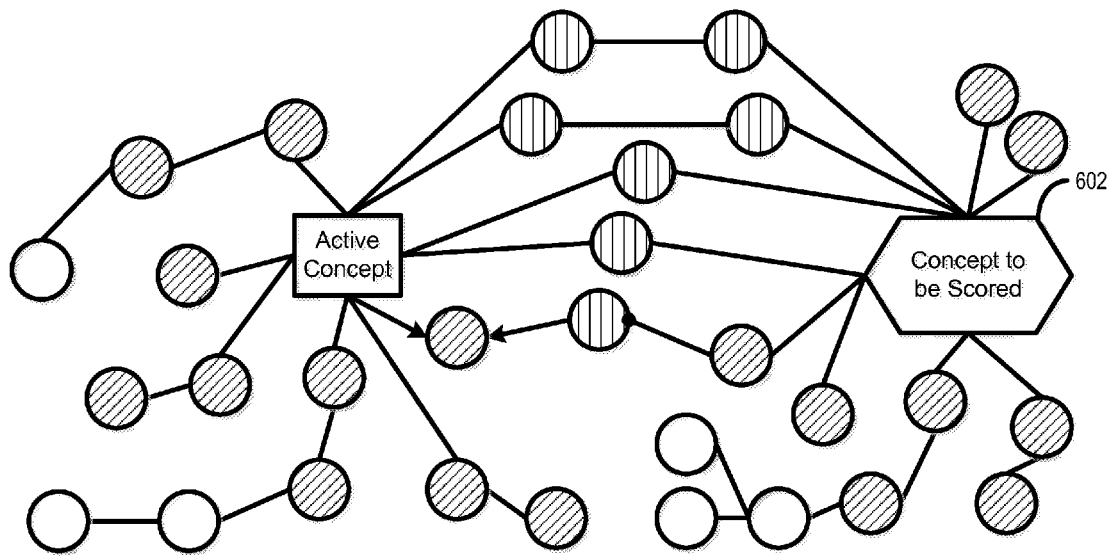

An example of computing a Jaccard score for a concept obtained in act 106 of process 100 is shown in FIG. 6B. In this example, the neighborhood of a concept has been selected as comprising concepts within two degrees of separation of the concept. Though, it should be recognized, that a neighborhood associated with any suitable degree of separation may be used. Accordingly, all concepts within two degrees of either the active concept or concept 602, which is the concept to be scored, have been indicated with diagonal lines, unless they are within two degrees of separation from both the active concept and concept 602; such concepts, being within two degrees of both the active concept and concept 602, are indicated with vertical lines. To compute the Jaccard score, observe that the number of concepts with either diagonal or vertical lines is the number of concepts (25) in the denominator of the Jaccard score. The number of concepts with vertical lines (7) is the number of concepts in the numerator of the Jaccard score. Accordingly, the Jaccard score of concept 602 would be calculated as 7 divided by 25, or 0.38.

In some embodiments, such as the embodiment illustrated in FIG. 6B, neither the active concept nor the concept to be scored are considered neighbors of themselves or of one another. However, in other embodiments, the active concept and/or the concept to be scored may be considered as neighbors of themselves and/or of one another. In the illustration of FIG. 6B, for example, if the active concept and concept 602 were to be considered neighbors of themselves and of one another, the Jaccard score would be computed as 9 divided by 27, or 0.333.

In some embodiments, the Jaccard score may be calculated as the complement of the Jaccard index according to $1-J(A,B)$ such that the Jaccard score may be indicative of a measure of dissimilarity between concepts A and B. It should be recognized that in this case, concepts with lower scores (rather than higher scores) may be selected in act 108 of process 100. Further, in this case the concept with a higher Jaccard score would then be considered to possess a weaker relationship with the active concept than a concept with a lower score.

In cases when a Jaccard score is being computed for a concept obtained by using a retrieval operation (e.g., as described with reference to act 106), the Jaccard score may be obtained by applying the above-described techniques to the retrieved concept. However, when a Jaccard score is being computed for a concept synthesized via an addition operation, the Jaccard score may be obtained by applying the above-described techniques not to the synthesized concept, but rather to the concept that was combined with the active concept to produce the synthesized concept (e.g., the concept "shiatsu" shown in FIG. 5E). Similarly, when a Jaccard score is being computed for a concept synthesized via a substitution operation, the Jaccard score may be obtained by applying the above-described techniques not to the synthesized concept, but to the concept that was used to substitute an attribute of the active concept as part of the substitution (e.g., the concept "press sets" shown in FIG. 5H).

IV.D Statistical Coherence Score

Another technique for computing scores for concepts obtained in act 106 is the so-called "statistical coherence" technique where the statistical coherence score assigned to a particular concept will depend on the frequency of co-occurrence of that concept with the active context in one or more text corpora. As such, a concept that co-occurs more frequently with the active concept may be more relevant to the active concept than a concept that co-occurs less frequently with the active concept.

Any suitable corpus or corpora may be used to calculate the statistical coherence score for a concept obtained in act 106 of process 100. For example, the corpora may be from a single source (e.g., all content found at URLs containing the string "wikipedia.org") or multiple sources. As another example, subject-specific corpora may be used such as corpora containing content about politics, medical articles, sports, etc. Each corpus may be of any suitable type and, for example, may be a text corpus or a corpus containing multiple types of content.

Regardless of the number and types of corpora used for calculating coherence scores, in some embodiments, the active concept may be used to select a subset of content in the corpora (e.g., a portion of the documents in a text corpus) to use for calculating statistical coherence scores. This may be done in any suitable way. For example, the active concept may be used to select content relevant to the active concept, which, for example, may be only that content which contains the label of the active concept.

In some embodiments, the content used for statistical coherence calculations may be further restricted to that content which contains the active concept and at least one of the concepts in a neighborhood of the active concept in the semantic network. Recall that such a neighborhood may include all concepts, in the semantic network, that are within a predetermined number of degrees of separation (e.g., one, two, three, four, etc.) from the active concept. The additional restriction may be accomplished in any suitable way and, for example, may be achieved by using only that content which contains the label of the active concept and the label of at least one other concept in the neighborhood of the active concept. Restricting the corpora based on the active concept as well as its neighbors may be advantageous in that content that includes the label of the active concept, but is directed towards a distinct meaning, is not considered when calculating a statistical coherence score.

For example, if the active concept is "bat" and the concepts found within the active concept's neighborhood include the concepts "baseball bat," "club," "paddle," and "lumber," the content used for calculating statistical coherence scores may be limited to content that includes the active concept "bat" and at least one of the neighboring concepts "baseball bat," "club," "paddle," and "lumber." The inclusion of at least one of these neighbors may increase the likelihood that documents that include the concept "bat," but are related to the mammal, are avoided when calculating the statistical coherence score.

Accordingly, in some embodiments, the statistical coherence score may be computed as a function of the ratio of the number of documents containing both the active concept, at least one concept in a neighborhood of the active concept, and the concept to be scored and the number of documents containing the active concept and the at least one concept in the neighborhood of the active concept. The function may be any suitable function and, for example, may be the identity function or any other suitable monotonically increasing function (e.g., logarithm). When calculated in this manner, the statistical coherence score may reflect the proportion of the total number of documents relevant to the active concept that are also relevant to the concept to be scored. Accordingly, the higher the statistical coherence score for a concept the more likely it may be that this concept is relevant to the active concept.

In some embodiments, the statistical coherence score may be computed as a function of the ratio of the number of documents containing the active concept, at least one concept in a neighborhood of the active concept, the concept to be scored, and at least one concept in the neighborhood of the concept to be scored (in the numerator) with the number of documents containing the active concept and at least one concept in a neighborhood of the active concept (in the denominator). Calculating a statistical coherence score in this way may be advantageous in that content that includes the label of the concept to be scored, but is directed towards a distinct meaning, is not considered when calculating a statistical coherence score.

For example, the concepts "field game" and "sport" may be neighbors of the candidate "cricket." Restricting the documents used in computing the statistical coherence score to only the documents that include the concept "cricket" and at least one concept from among "field game" and "sport" may increase the likelihood that documents that include the concept "cricket," but are related to the insect, are avoided when calculating the statistical coherence score.

In some embodiments, the statistical coherence score may be computed by using only a subset of the documents containing the active concept, at least one concept in the neighborhood of the active concept, the concept to be scored, and, optionally at least one concept in the neighborhood of the concept to be scored. In this case, the statistical coherence score may be computed as a function of a so-called term frequency (TF) score of the concept to be scored in one or more documents in the aforementioned subset of documents.

In some embodiments, a TF score for a concept to be scored may be calculated for each document in the subset and the statistical coherence score may be calculated as the average or median of the computed TF scores. Alternatively, the statistical coherence score may be calculated as the largest calculated TF score. This may be advantageous in situations when a concept to be scored appears infrequently in a large number of documents within the subset of documents used for calculating the statistical coherence score.

In yet another embodiment, the statistical coherence score may be computed as a function of the inverse document frequency (IDF) score, which may be computed as a reciprocal of how frequently a concept to be scored appears within the set of documents used for calculating the statistical coherence score. In yet another embodiment, the statistical coherence score may depend on the product of the term frequency and the inverse document frequency scores. It should be appreciated that, in some embodiments, values calculated in the process of computing the statistical coherence score may be normalized.

It should be appreciated that, just as the case may be when computing the Jaccard score, the way in which the statistical coherence score is calculated may depend on whether the concept to be scored was retrieved from the semantic network or, instead, was synthesized during act 106 of process 100. In the case that the concept to be scored was synthesized by using an addition operation, the statistical coherence score may be obtained by applying the above-described techniques not to the synthesized concept, but rather to the concept that was combined with the active concept to produce the synthesized concept (e.g., the concept "shiatsu" shown in FIG. 5E). Similarly, when a statistical coherence score is being computed for a concept synthesized via a substitution operation, the statistical coherence score may be obtained by applying the above-described techniques not to the synthesized concept, but to the concept that was used to substitute an attribute of the active concept as part of the substitution (e.g., the concept "press sets" shown in FIG. 5H).

IV.E Cosine Similarity Score

In the cosine similarity technique, the cosine similarity score of a particular concept may be calculated by using the cosine similarity metric for evaluating semantic proximity between pairs of concepts. To evaluate the cosine similarity metric between two concepts A and B, each of the concepts is mapped to two vectors in Euclidean space of any suitable dimension. The cosine similarity between the two concepts may then be computed as the ratio between the inner product between the two vectors and the product of the magnitudes of the two vectors. This ratio represents the cosine of the angle between the two vectors, giving rise to the name "cosine similarity."

A concept may be mapped to a vector in any suitable way. For example, a concept may be mapped to a vector comprising a coordinate for each of the concept's attributes, with each coordinate containing a number associated with the attribute. Thus, if concept A has ten attributes, the concept may be mapped to a ten-dimensional vector such that the number in each dimension is associated to the corresponding attribute. The number corresponding to an attribute may be any suitable number and, for example, may be a term frequency (TF) score or a TF-IDF score associated with the attribute.

IV.F Integrated Score

As previously mentioned, any of the types of scores described above may be combined to form an integrated score that may be assigned to the concepts obtained in act 106 of process 100. Though, in some embodiments, the scores need not be combined and only one of the aforementioned types of scores may be assigned to each concept obtained in act 106.

In embodiments where one or more types of scores may be combined to form an integrated score, the scores may be combined in any of numerous ways. For example, the scores may be combined by computing a weighted linear combination of the scores to compute the integrated score. The weights used to combine the scores may be any suitable weights and may be increased or decreased to reflect which scores should be weighted more when combining the scores into an integrated score. The scores and/or weights may be normalized in any suitable way prior to be combined into an integrated score.

After a score is assigned for the concepts obtained in act 106 of process 100, one or more of the scored concepts may be selected for subsequent use based on the calculated scores. The score-based selection may be done in any suitable way. In some embodiments, for example, concepts associated with a score above a predetermined threshold may be selected for subsequent use. Alternatively, a predetermined number or percentage of the top-scoring concepts may be selected. Though, it should be recognized that many other ways of utilizing scores to select one or more concepts will be apparent to one skilled in the art.

V. Provide Content to User(s) Based on Active Concept and Selected Concept(s)

After one or more concepts relevant to the active concept are selected in act 108, process 100 proceeds to act 110, where information may be provided to the user(s) associated with the user context information obtained in act 102, based at least in part on the active concept identified or generated in act 104 and the relevant concept(s) selected in act 108. To this end, information to present to the user(s) may be selected from among a larger set of information by using the active concept and relevant concept(s) selected in act 108. Though, it should be recognized that the type of information provided to the user(s) and the manner in which the information may be provided to the user(s) may vary depending on the specific scenario in which the techniques described herein may be applied.

As previously mentioned, in some embodiments, user context information obtained in act 102 may comprise information provided by a user that may indicate the type of information that the user may be interested in. For example, the user context information may comprise a user request for information that the user may be seeking. Such a request may be in any suitable form such as a search query or one or more settings indicating that the user wishes to receive news updates related to a certain topic or topics, advertisements relating to one or more types of product(s), information about updates on any of numerous types of websites, newsletters, e-mail digests, etc. Accordingly, in response to the request, the user may be presented with information obtained, from among a large set of content that may be presented to the user, based at least in part on the active concept, which was derived from the user's request, and the relevant concepts to the active concept that were selected in act 108.

For example, if the user's request comprised a search query, the active concept and the related concepts, selected in act 108, may be used to generate one or more search queries to be provided to one or more search services. This may be done in any suitable way. For example, a search query may be constructed from the active concept and any of the selected concepts by using the labels and attributes associated with these concepts. A search query may be formed by joining the concept labels and attributes from the active concepts and any of the selected concepts by using various Boolean operators such as "AND" and "OR." For example, if the active concept representing a user's search query is the concept "yoga mat," described with reference to FIG. 5F and the concept "sweat-absorbent yoga mat" is selected in act 108, a search query "(yoga mat) AND (sweat-absorbent)" may be formed. As another example, if the active concept representing a user's search query is the concept "recliner," described with reference to FIG. 5D and the concept "massage recliner" is selected in act 108, a search query "(recliner) OR (massage recliner)" may be formed. Other more complex search queries may be formed and may include keywords associated with multiple selected concepts, any disambiguation terms used to identify the active concept, and/or any other user context information. For example, suppose a user is searching for an Italian restaurant at 10 pm, while renting a car at the airport. The active concept "Italian restaurant" may be used to select relevant concepts such as "Pizza," "Pasta," and "Carbs" and, together with geo-spatial information about the user obtained from the user context information, be used to construct a query such as "(Italian Restaurant) OR (Pizza) OR (Pasta) OR (Carbs) AND (New York) AND (Airport) and (OPEN AFTER 10 pm)."

These types of complex queries would rarely be composed by users. Such queries create an effective semantic search, even if the content has not been semantically analyzed in advance (e.g., unstructured content), because such a query will match literal terms in the content indexed by the search service that are not necessarily literal terms in the original query.

The search service may be any general-purpose search engine. For instance, the search service may be any search engine that may be publicly accessible via the Internet. As another example, the search service may be a search engine accessible via any computer network other than the Internet. Examples of such search engines include search engines used for searching a corporate intranet or any other private network.

In response to issuing the one or more search queries to the search service, a set of search results may be received from the search service. The text (or fragments of the text) of the documents or pieces of content in the search results may be compared to the active concept and/or the concept(s) selected in act 108 and the returned search results may be ranked and/or filtered out based on how closely they match these concept definitions.

Any of a variety of possible ranking or filtering techniques may be used, as the invention is not limited in this respect. However, such techniques may enable the provisioning of content to users without overwhelming the users with information irrelevant to the users. Search services may provide a number of textual features in their search results: titles, abstracts, descriptions, tags, hyperlinks, etc. These textual features may provide for text analysis as a means to filter the search engine results against the terms provided through concepts selected in act 108, for example, by comparing the terms against words in the textual features of the search engine results. Whole or partial matches of terms may be used to weight the relevance of the individual results. In some embodiments, the search results returned from the search service may not include the identified pieces of content themselves, but rather may include a list of hyperlinks to these pieces of content along with an excerpt of each piece of content. In such embodiments, rather than retrieving each piece of content using the provided hyperlink, the list of hyperlinks may be filtered and ranked using the associated excerpt, and the excerpt may be semantically annotated.

In some embodiments, user context information obtained in act 102 may comprise information related to a user that may indicate the type of information that the user may be interested in. For example, information related to the user may comprise demographic information, the user's Internet browsing history, any information associated with the user on a website such as a social networking website, geo-spatial information may comprise the current location of the user's computing, etc. Accordingly, the user may be presented with information obtained at least in part based on the active concept, which was derived from information related to the user, and the selected concepts.

For example, a user may be presented with personalized product and service recommendations based on the active concept and the selected concepts. Consequently, the personalized recommendations may reflect one or more of the user's interests. The personalized recommendations may include promotional content including, but not limited to, advertisements for products and/or services. For example, an active concept, derived from user context information, may indicate that the user is interested in "recliners." Accordingly, the user may be presented with advertisements related to "recliners" and to "massage recliners," which is a concept relevant to the active concept "recliners" as described with reference to FIG. 5D. As such, the user may not be presented with irrelevant promotional content.

As another example, a user may use an online information source (or multiple websites) to obtain information that the user may be interested in. The online information source may be any suitable information source and, for example, may be an Internet portal, an Intranet portal, a news website, a social networking website, a micro-blogging service, a blog service, a blog reader, a shopping website, real-time feeds, etc. Each such online information source may be configured to present any of numerous types of information to a user including, but not limited to, news, advertisements, content recommendations, real-time updates (e.g., tweets). As such, when the user uses the online information source, the user may not be overwhelmed with irrelevant content.

Accordingly, in some embodiments, the active concept and the selected concepts may be used to rank, prioritize and/or filter the information that may be presented to a user such that the information presented to the user may reflect that user's interests. This may be done in any suitable way. For example, any of the information that a website may be configured to present to a user may comprise one or more textual features (e.g., tags, text, hyperlinks, descriptions, etc.). These textual features may be compared to any keywords provided through the active concept and concepts selected in act 108. Whole or partial matches may be used to weight the relevant of the individual terms.

VI. Purchasing Advertisements Associated with Words and Phrases Based on Scoring Knowledge Representations From an ad purchaser's perspective, a significant problem with internet based advertising services is that bidding for advertisements that are associated with popular words related to their advertising campaign messaging may result in significantly inflated prices relative to the value received by the advertiser. This may result in difficulty in matching advertisements associated with words or phrases with the ad purchaser's messages in a cost effective manner. This may also indicate that advertisers lack information on the availability of lesser known words or phrases that may potentially be effective advertising keywords, and often by default gravitate toward advertisements that are most expensive due to the popularity to the general public of the words or phrases found in those advertisements. However, the ad purchasers may be overlooking ad words and phrases that may in fact be more cost effective. The present system and method addresses this problem, building on aspects of the above-described techniques that employing knowledge representation and semantic relevance.

As will now be described, various embodiments of the present system and method may be utilized to purchase an advertisement associated with an advertising word or phrase based on a knowledge representation of an active concept and one or more relevant concepts as described above. More generally, in accordance with one embodiment, a system and method comprises first obtaining a purchaser-context information associated with at least one purchaser. Here, a purchaser refers to anyone seeking to purchase one or more advertisements for the purposes of promoting or advertising to one or more users.

In an embodiment, at least one processor is used to execute stored program instructions to purchase an advertisement associated with at least one advertising word or phrase that has a value to the purchaser that exceeds the purchase price of the at least one advertising word or phrase. By way of example, any one of the scoring methods as described above may be used to rank and select one or more identified concepts by using one or more relevance measures. The value of a particular advertising word or phrase may thus based on a semantic relevance, as derived from a knowledge representation, between a first concept associated with the purchaser-context information and a second concept associated with the at least one advertising word or phrase. As detailed above, the first and second concepts in the knowledge representation may be represented by a data structure in a semantic network, such as described for example in U.S. application Ser. No. 12/671,846, titled "Method, System, And Computer Program For User-Driven Dynamic Generation Of Semantic Networks And Media Synthesis" by Peter Sweeney et al., referenced earlier. The foregoing example may be just one instance of a knowledge representation and is meant to be illustrative and not limiting.

In an embodiment, the advertising word or phrase is based on a retrieval operation or synthesis operation performed on a knowledge representation, as detailed earlier in this disclosure in Section III, entitled "Identify Concepts Relevant to Active Concept". Accordingly, one or more second concept associated with at least one advertising word or phrase may be identified or generated by obtaining a plurality of concepts semantically relevant to the first concept. A computed score for each of the plurality of concepts may be used to determine each of the plurality of concept's semantic relevance to the first concept, and based on the scoring, one or more of the second concepts may be selected. The one or more second concepts may correspond to one or more semantically relevant ad words or phrases corresponding to the first concept. Thus, advertisements that are associated with these semantically relevant ad words or phrase may be considered for purchase.

Figure 7:
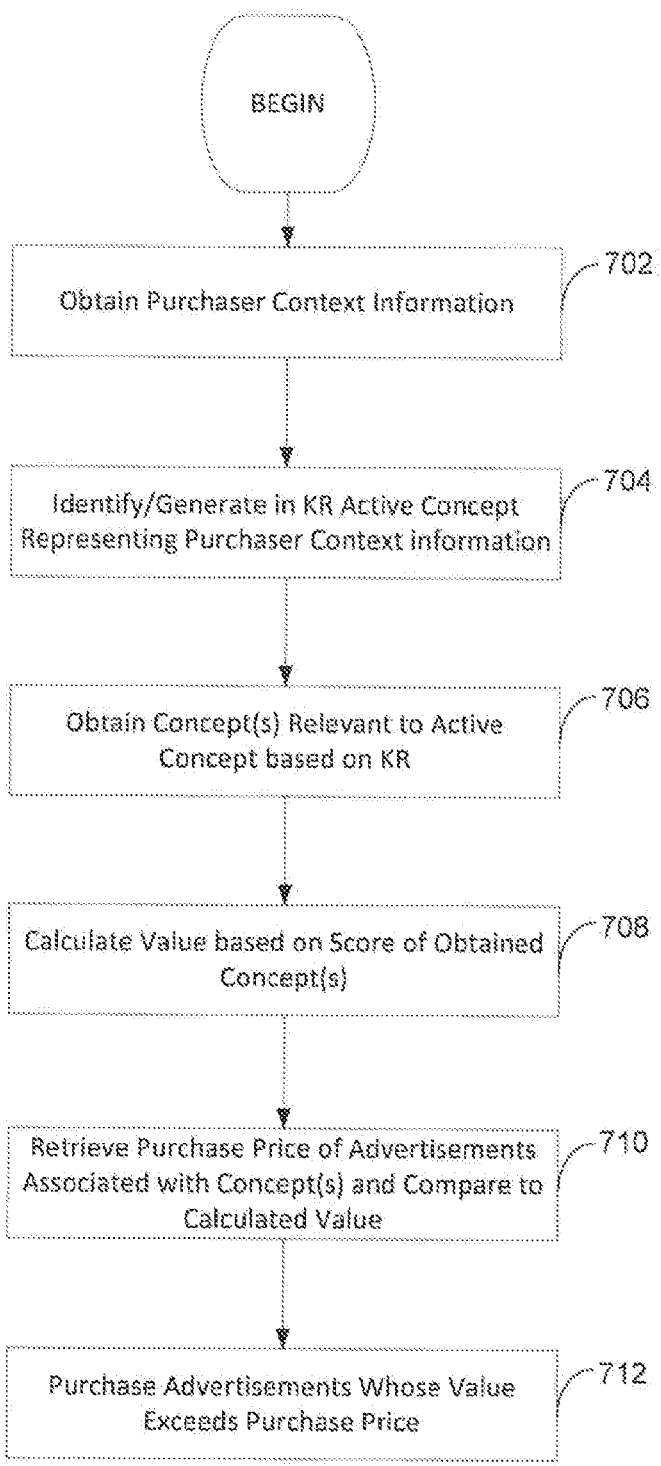
FIG. 7 illustrates a graph in which popularity of an advertisement associated with an advertisement word or phrase is plotted against value or cost.

FIG. 7 is a flow chart of an illustrative process 700 for purchasing an advertisement based on a KR. The process of FIG. 7 begins at act 702, where a purchaser context information may be obtained. This purchase context information may be any suitable information associated with the purchaser and/or provided by the purchaser. The purchaser may further register his or her websites, online-catalogue or other electronic media, all or any combination of which may then provide the purchase context.

All of the techniques for obtaining context information, as described above with respect to a user in the section "II. Obtaining Use Context Information" and act 102 of process 100, may be applied to obtain a context of a purchaser. Demographic, browsing, multimedia or geo-spatial information described in more detail above with respect to obtaining a user context may be employed to capturing a context of a purchaser. Further, the purchaser may employ context information that describe the target audience rather than the purchaser. For example, the purchaser may be interested in the characteristics of individuals that may be likely to consume the purchaser's goods and/or services. Accordingly, the purchaser may specify indicators describing these features, for example by typing in locations or demography parameters describing such consumer characteristics.

Following act 702, process 700 then continues to act 704, where an active concept representing the relevant portion of the purchaser context is either identified or generated in the KR. Act 704 in many aspects parallels act 104 of process 100 and the techniques described above in the section "II. Identifying or Generating Active Concept Representing User Context Information", except that the techniques may be applied to the context of a purchaser rather a user. Similarly, act 706 and 708 that illustrate obtaining, scoring and selecting relevant concepts essentially parallel the methodologies illustrated in acts 106 and 108 of Process 100 respectively, and described in greater detail above in the section "III. Identifying Concepts Relevant to Active Concept" and "IV. Score and Select Identified Concept(s) by using Relevance Measure or Measures" respectively. The KR used for obtaining semantically relevant concepts in item 706 may be constructed based on any content, though in some embodiments the content used to form the KR may directed towards a subject pertaining to the goods or services the purchaser may be advertising.

Act 708 of process 700 entails calculating a value based on the score of the selected concepts. Such a value may be calculated in any of a number of suitable ways. One technique may include employing a dollar factor that is multiplied by the numerical value of the score. A dollar factor may take into consideration any normalization of scoring that has taken place. In other embodiments, the dollar value may be assigned to concepts by taking into account any scaling considerations necessary that may in turn depend on any of the numerous scoring methods described in greater detail above. An advertisement associated with any advertising word or phrase sharing a label of a concept may then be assigned a value of the dollar amount calculated for that label or concept.

In some embodiments, an advertisement word or phrase may possess an association to an advertisement if the advertisement word or phrase may be used in the process of selecting an advertisement for purchase. In other embodiments, an advertising word or phrase may possess an association to an advertisement if the advertising word or phrase may be used in determining whether the advertisement will be displayed. These associative relationships between advertisements and advertising words or phrases are described in further detail below.

A yet further technique for calculating a value may take into consideration the advertisers overall purchasing budget. In one approach, the total number of top scored concepts may then each receive an equal share of the purchasing budget. Alternatively, the purchasing budget may be allocated to a predetermined number of top-scoring concepts, wherein the top scoring concept receives the greatest proportion of the budget, the second highest scoring concept receives the second greatest proportion of the budget, etc. An advertisement associated any advertising word or phrase sharing a label of a concept may then be assigned a value of the dollar amount calculated for that label or concept.

After values have been calculated based on scored concepts, process 700 then proceeds to act 710, where purchase prices of advertisements based on the selected concepts may be retrieved. Advertisements may be based on the selected concepts in that the advertisement may be associated with advertisements words or phrases that share the label of the concepts. An advertisement, in turn, may be associated to an advertisement word or phrase if the advertisement word or phrase may be used in the process or purchasing the advertisement or determining whether the advertisement will be displayed.

One example of an association between an advertisement and an advertisement word or phrase may be illustrated in the space of user-search result advertisements. An advertisement may be purchased such that any user-search query that employs all or a portion of pre-specified advertisement words or phrases will result in the advertisement being displayed adjacent to the results of the user search query. A similar associative relationship may be envisioned with banner advertisements, where the pre-specified advertisements words or phrases may occur within the content or meta-data of a website tied to a particular URL.

In yet another example of an advertisement association with an advertisement word or phrase may occur in the setting of a social network. In some embodiments, social networks may allow a purchaser to list interests associated with the purchasers target audience, which will result in users of that social network that possess those interests observing advertisements from the purchaser. Thus, the advertisement is associated with the advertising words or phrases describing interests of prospective consumers.

The cost of the advertisement may vary depending on what advertising words or phrases the advertisement is associated with, as explained above due to the popularity of the advertising word or phrase. Accordingly, the price of an advertisements associated with an advertising word or phrase that shares the label of a selected concept may be determined. In some embodiments, the price may be manually retrieved by a human operator. In yet other embodiments, and as further described below, the purchase price of an advertisement associated with an advertising word or phrase may be automatically retrieved by a purchasing agent.

Figure 8:
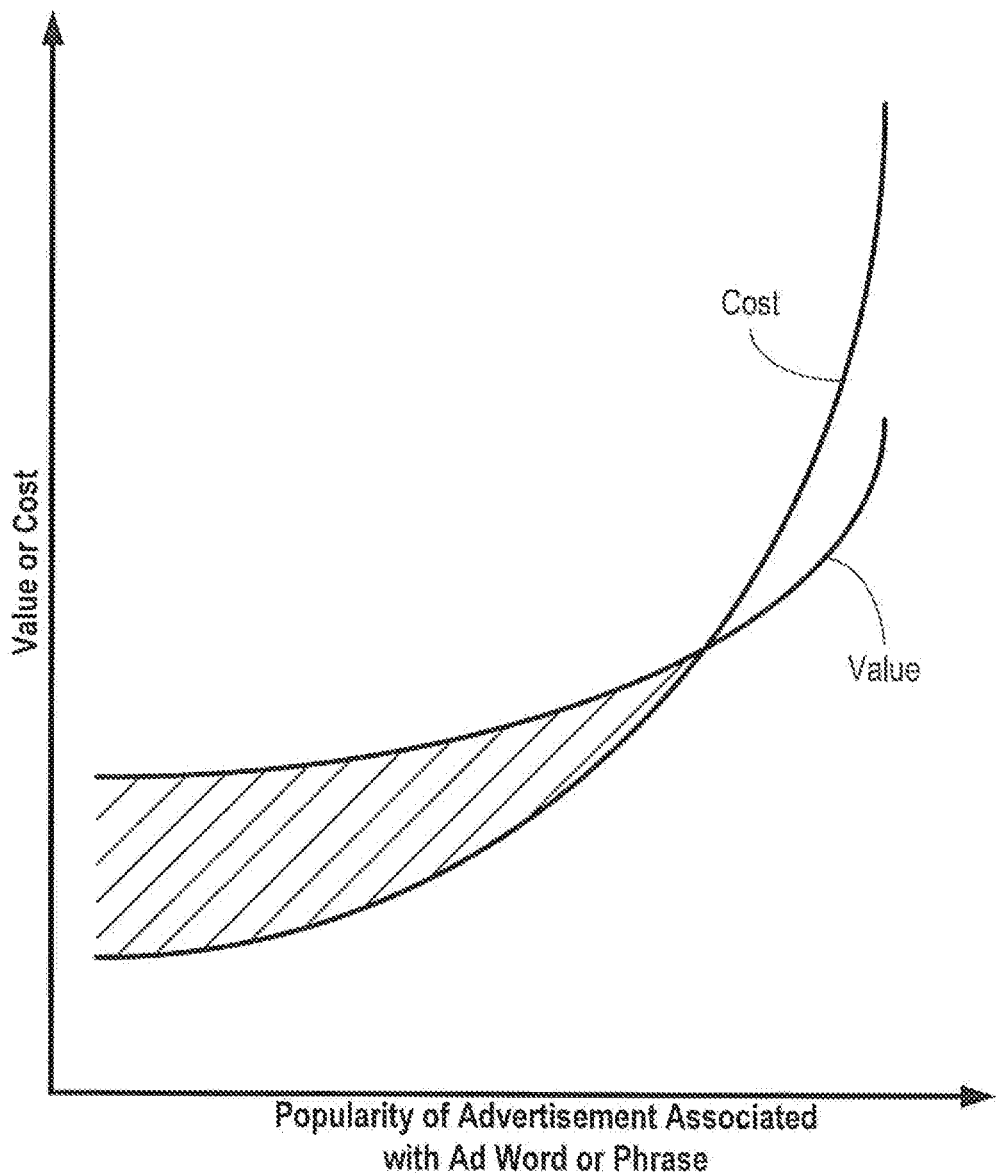
FIG. 8 illustrates an overview of a system and method for selecting an ad word or phrase in accordance with an embodiment.

Following act 710 of FIG. 7, process 700 proceeds to act 712 where an advertisement is purchased in the event that the value of the advertisement as calculated in item 708 exceeds the purchase price of the advertisement as determined in act 710. FIG. 8 illustrates one situation where act 710 is carried out and a determination may be made whether the value to the purchase of an advertisement exceeds the purchase price of the advertisement.

The system and method of the present disclosure is able to enhance advertising value by helping advertisers to automatically locate advertisements associated with advertising words or phrases that have strong semantic relationships to an ad campaign messaging, but which may not the most popular ad words or phrases with their associated high purchase costs.

FIG. 8 illustrates where an advertisement popularity is graphed along the x-axis, and Value or Cost is graphed along the y-axis. As shown in FIG. 8, a plotted Cost curve and a Value curve intersect, and the shaded area between the Cost and Value curves represent advertising associated with advertisement words or phrases that have strong semantic relationships to an advertising campaign's messaging, and yet are still cost effective as their assessed value (e.g. as calculated according to any one of the scoring methods earlier described) exceeds the costs of purchasing the advertisement associated with advertisement words or phrases.

In an embodiment, the disclosed system and method may be adapted to automatically initiate an ad or marketing campaign given the availability of cost effective advertising keywords. For example, the system and method of the present disclosure may be adapted to automatically bid for and buy ad words or phrases when the ad words or phrases fall within a desired range. For example, referring to the illustration in FIG. 8, an ad word or phrase falling within the desired shaded area between the curves may be automatically bid for and purchased, as the assessed value of those keywords are calculated to be greater than their cost. As the costs of these advertising associated with advertising words or phrases may fluctuate over time based on popularity of the associated words or phrases, the automated bidding and buying of advertisements based on the words or phrases by the present system and method may be used to time the purchase those advertisements at a desirable cost.

In an embodiment, a purchasing software agent may be employed to monitor the availability of advertisements associated with selected ad words or phrases that have been determined to be valuable based on the calculations as described above. Autonomous or semi-autonomous agents tasks may be based on the teachings of software agents disclosed in the U.S. application Ser. No. 13/164,732, filed Jun. 20, 2011, titled "Software Agents in the Context of Semantic Networking", which is hereby incorporated by reference in its entirety. Preferably, the purchasing agent is automated, but the purchasing agent could also perform the purchasing operations with manual intervention if necessary. The automated purchasing agent may be adapted to monitor when one or more selected ad words or phrases become available in one or more advertising channels being monitored. For example, one or more search engines, vendors, social networks, etc. may be monitored for the availability of one or more available ad words or phrases that have been determined to be of value.

When an advertisement associated with a selected ad word or phrase becomes available for a purchase cost or an initial bid that is less than the calculated value of the ad word or phrase, then the purchasing agent may be adapted to either automatically bid for or purchase the available advertisement for a price less than or equal to the calculated value. Alternatively, the purchasing agent may also present the advertisement or associated ad word or phrase together with its calculated value prior to the purchase, such that the purchasing agent can receive approval from the purchaser to purchase the ad word or phrase and launch an ad campaign in one or more advertising channels.

More generally, the purchasing agent may perform one or more of the following tasks. The purchasing agent may identifying the purchase price of the advertisement associated with the advertising word or phrase that shares a concept label associated with a concept. If so, the purchasing agent may purchase the advertisement upon determining that the calculated value exceeds the purchase price. As noted above, the purchasing agent may also request approval for the purchase by reporting an available or imminent purchase, and a corresponding ad campaign that may be launched with the purchased advertisements in given advertising channels.

In an embodiment, the purchaser-context information may comprise information received from at least one purchaser, purchaser website information, information typed in the by purchaser and/or information highlighted by the purchaser as described further detail above.

In another embodiment, the desired range in which advertisement associated with an ad word or phrase falls in order to trigger a bid may be expressed as a target price range for a particular advertisement. If the purchase price for a number of advertisements, each associated with different advertisement words or phrases are being monitored at the same time, automated bidding and buying of advertisements may be triggered for the advertisements associated with ad words or phrases which are considered to currently have the most value, based on the differential between their current cost and their assessed values.

In another embodiment, the system and method of the present invention may be adapted to track automated bidding and buying of advertisements associated with ad words or phrases over a period of time. The present system and method may track the bidding and buying during events recurring periodically, or bidding and buying triggered by a particular type of event. For example, a pattern of bidding for and buying may recur every season, when advertisements associated with ad words or phrases related to various types of indoor or outdoor recreational activities may become more popular. As another example, a pattern of bidding for and buying may recur upon occurrence of a certain type of triggering event, such as news about a certain type of stock market event. This history of bidding and buying of advertisements associated with ad words or phrases that may be recorded by the present system and method may be analyzed in order to determine the best time to bid for and buy an advertisement associated with a particular ad words or phrase, based on the success of bids made and purchases in the past.

In an embodiment, the present system and method may be further adapted to provide ad purchasers with feedback reports on the effectiveness of their advertising campaigns. For example, these feedback reports may be adapted to show how well different advertising bid for and bought are performing in an advertising campaign over time. This feedback information generated by the present system and method may be analyzed by using complex-adaptive feedback technology to adapt and hone the advertising campaigns over time with better selections of advertisements associated with advertising words or phrases.

In addition, by automating much of the analytical process involved in bidding for and buying keywords at a desirable cost, and by analyzing the performance of the advertising campaigns over time based on the keywords (e.g. as performed by an automated purchasing agent), the system and method of the present disclosure may save time and significantly reduce overall costs for advertisers.

VII. Additional Implementation Detail

Figure 9:
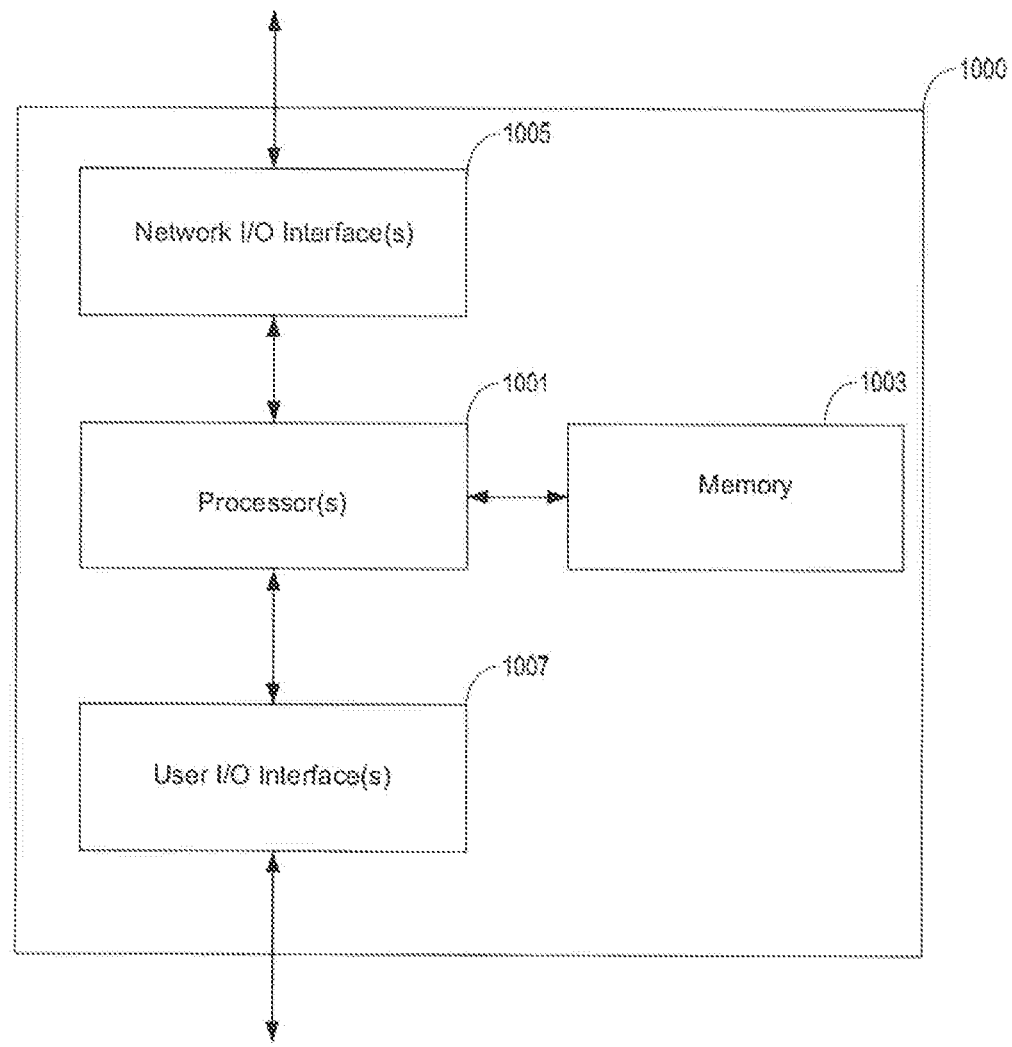
FIG. 9 is a block diagram of a computing device on which some embodiments of the present disclosure may be implemented.

The above-discussed computing devices (e.g., client computer and server shown in FIGS. 2A and 2B) may be implemented in any of a variety of ways. FIG. 9 is a block diagram an illustrative computing device 1000 that may be used to implement any of the above-discussed computing devices.

The computing device 1000 may include one or more processors (e.g., microprocessors) 1001 and one or more tangible, non-transitory computer-readable storage media (e.g., memory 1003). Memory 1003 may store, in tangible non-transitory computer-readable storage media computer instructions that implement any of the above-described functionality. Processor(s) 1001 may be coupled to memory 1003 and may execute such computer instructions to cause the functionality to be realized and performed. Computing device 1000 may also include a network input/output (I/O) interface 1005 via which the computing device may communicate with other computers (e.g., over a network). In some embodiments, the computing device may also include one or more user I/O interfaces, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code may be embodied as stored program instructions that may be executed on any suitable processor or collection of processors (e.g., a microprocessor or microprocessors), whether provided in a single computer or distributed among multiple computers.

It should be appreciated that a computer may be embodied in any of numerous forms, such as a rack-mounted computer, a desktop computer, a laptop computer, or a tablet computer. Additionally, a computer may be embodied in a device not generally regarded as a computer, but with suitable processing capabilities, including a Personal Digital Assistant (PDA), a smart phone, a tablet, a reader, or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including networks such as a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory tangible computer-readable storage medium (e.g., a computer memory, one or more floppy discs, compact discs, optical discs, magnetic tapes, flash memories, circuit configurations in Field Programmable Gate Arrays or other semiconductor devices, etc.) article(s) encoded with one or more programs that, when executed on one or more computers or other processors, implement the various process embodiments of the present invention. The non-transitory computer-readable medium or media may be transportable, such that the program or programs stored thereon may be loaded onto any suitable computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, items, components, data structures, etc. that perform particular tasks or implement particular abstract data types. Typically the functionality of the program modules may be combined or distributed as desired in various embodiments.

Also, data structures may be stored in non-transitory tangible computer-readable storage media articles in any suitable form. For simplicity of illustration, data structures may be shown to have fields that are related through location in the data structure. Such relationships may likewise be achieved by assigning storage for the fields with locations in a non-transitory tangible computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which multiple examples have been provided (e.g., processes 100, 300, and 700). The acts performed as part of the method may be ordered in any suitable way. Accordingly, embodiments may be constructed in which acts are performed in an order different than illustrated, which may include performing some acts simultaneously, even though shown as sequential acts in illustrative embodiments, or vice versa.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications, and improvements will readily occur to those skilled in the art. Such modifications and improvements are intended to be within the spirit and scope of the invention. Accordingly, the foregoing description is by way of example only, and is not intended as limiting.

Thus, in an aspect, there is provided a computer-implemented method for purchasing an advertising word or phrase based on a knowledge representation, the method comprising: obtaining a purchaser-context information associated with at least one purchaser; purchasing, with at least one processor executing stored program instructions, at least one advertising word or phrase that has a value to the purchaser that exceeds the purchase price of the at least one advertising word or phrase; wherein the value is a based on a semantic relevance, derived from a knowledge representation, between a first concept associated with the purchaser-context information and a second concept associated with the at least one advertising word or phrase; and the first and second concepts in the knowledge representation are represented by a data structure in the knowledge representation.

In an embodiment, the advertising word or phrase is based on a retrieval operation or synthesis operation performed on the knowledge representation.

In another embodiment, the knowledge representation is a semantic network.

In another embodiment, the second concept associated with the at least one advertising word or phrase is identified or generated by: obtaining a plurality of concepts semantically relevant to the first concept; computing a score for one or more concepts in the plurality of concepts, wherein the score for a concept is indicative of the semantic relevance of the specific concept to the first concept; and selecting the second concept based on scores computed for the one or more concepts.

In another embodiment, the method further comprises presenting the advertising word or phrase, prior to the purchase, to the purchaser.

In another embodiment, the method further comprises presenting the value to the purchaser.

In another embodiment, the purchasing is performed by an agent.

In another embodiment, the agent performs at least one of the following: identifying the purchase price of the advertising word or phrase that shares a label associated with a concept; purchasing the advertising word or phrase upon determining the value exceeds the purchase price; requesting approval for the purchasing; reporting an imminent purchase or that the purchasing of an advertising word or phrase; or some combinations thereof.

In another embodiment, obtaining the purchaser-context information comprises receiving registration information from the at least one purchaser, purchaser website information, information typed in the by purchaser and/or information highlighted by the purchaser.

In another aspect, there is provided a system for purchasing an advertising word or phrase based on a knowledge representation, the system adapted to: obtain a purchaser-context information associated with at least one purchaser; purchase, with at least one processor executing stored program instructions, at least one advertising word or phrase that has a value to the purchaser that exceeds the purchase price of the at least one advertising word or phrase; wherein the value is a based on a semantic relevance, derived from a knowledge representation, between a first concept associated with the purchaser-context information and a second concept associated with the at least one advertising word or phrase; and the first and second concepts in the knowledge representation are represented by a data structure in the knowledge representation.

In an embodiment, the advertising word or phrase is based on a retrieval operation or synthesis operation performed on the knowledge representation.

In another embodiment, the knowledge representation is a semantic network.

In another embodiment, the second concept associated with the at least one advertising word or phrase is identified or generated by: obtaining a plurality of concepts semantically relevant to the first concept; computing a score for one or more concepts in the plurality of concepts, wherein the score for a concept is indicative of the semantic relevance of the specific concept to the first concept; and selecting the second concept based on scores computed for the one or more concepts.

In another embodiment, the system is further adapted to present the advertising word or phrase, prior to the purchase, to the purchaser.

In another embodiment, the system is further adapted to present the value to the purchaser.

In another embodiment, the purchasing is performed by an agent.

In another embodiment, the agent performs at least one of the following: identify the purchase price of the advertising word or phrase that shares a label associated with a concept; purchase the advertising word or phrase upon determining the value exceeds the purchase price; request approval for the purchasing; report an imminent purchase or that the purchasing of an advertising word or phrase; or some combinations thereof.

In another embodiment, the system is further adapted to receive registration information from the at least one purchaser, purchaser website information, information typed in the by purchaser and/or information highlighted by the purchaser.

In another aspect, there is provided a non-transitory computer-readable medium storing code that when executed on a computer device adapts the device to purchase an advertising word or phrase based on a knowledge representation, the computer-readable medium comprising: code for obtaining a purchaser-context information associated with at least one purchaser; code for purchasing, with at least one processor executing stored program instructions, at least one advertising word or phrase that has a value to the purchaser that exceeds the purchase price of the at least one advertising word or phrase; wherein the value is a based on a semantic relevance, derived from a knowledge representation, between a first concept associated with the purchaser-context information and a second concept associated with the at least one advertising word or phrase; and the first and second concepts in the knowledge representation are represented by a data structure in the knowledge representation.

In an embodiment, the advertising word or phrase is based on a retrieval operation or synthesis operation performed on the knowledge representation.

The invention claimed is:

1. A computer-implemented method for purchasing an advertisement opportunity based on a knowledge representation, the method comprising:
  obtaining purchaser-context information associated with at least one purchaser;
  computing, using at least one processor executing stored program instructions, a value, specific to the at least one purchaser, of an advertisement opportunity associated with at least one advertising word or phrase, the computing comprising:
    identifying, in a knowledge representation encoded as a data structure, a first concept representing at least a portion of the purchaser-context information,
    identifying, in the knowledge representation, a second concept with which the at least one advertising word or phrase shares at least one label,
    determining a semantic relevance between the first concept and the second concept based at least in part on the first and second concepts' relative positions in a topology of the knowledge representation, and
    computing the value of the advertisement opportunity as a function of the determined semantic relevance between the first and second concepts;
  comparing the computed value to a purchase price of the advertisement opportunity; and
  purchasing the advertisement opportunity in response to determining that the computed value exceeds the purchase price.

2. The computer-implemented method of claim 1, further comprising identifying the advertising word or phrase based on a retrieval operation or synthesis operation performed on the knowledge representation.

3. The computer-implemented method of claim 1, wherein the knowledge representation comprises a semantic network.

4. The computer-implemented method of claim 1, wherein identifying the second concept comprises:
  obtaining a plurality of concepts semantically relevant to the first concept;
  computing, for each of one or more concepts in the plurality of concepts, a score indicative of the semantic relevance of the respective concept to the first concept; and selecting the second concept from the one or more concepts based on the computed scores.

5. The computer-implemented method of claim 1, further comprising:
presenting the advertisement opportunity and/or the at least one advertising word or phrase, prior to the purchase, to the at least one purchaser.

6. The computer-implemented method of claim 1, further comprising presenting the computed value to the at least one purchaser.

7. The computer-implemented method of claim 1, wherein the purchasing is performed by an agent.

8. The computer-implemented method of claim 7, further comprising performing, by the agent, at least one act selected from the group consisting of:
identifying the purchase price of the advertisement opportunity associated with the at least one advertising word or phrase;
requesting approval for the purchasing; and
reporting an imminent purchase or the purchasing of the advertisement opportunity.

9. The computer implemented method of claim 1, wherein obtaining the purchaser-context information comprises receiving registration information from the at least one purchaser, purchaser website information, information typed in by the at least one purchaser and/or information highlighted by the at least one purchaser.

10. The computer-implemented method of claim 1, wherein identifying the first concept in the knowledge representation comprises:
searching the knowledge representation for the first concept; and/or
generating the first concept and adding the generated first concept to the knowledge representation.

11. The computer-implemented method of claim 1, wherein computing the value of the advertisement opportunity comprises allocating a portion of the at least one purchaser's purchasing budget determined based at least in part on the semantic relevance between the first and second concepts.

12. A system comprising:
at least one processor; and
at least one storage medium storing processor-executable instructions that, when executed by the at least one processor, perform a method for purchasing an advertisement opportunity based on a knowledge representation, the method comprising:
obtaining purchaser-context information associated with at least one purchaser;
computing a value, specific to the at least one purchaser, of an advertisement opportunity associated with at least one advertising word or phrase, the computing comprising:
identifying, in a knowledge representation encoded as a data structure, a first concept representing at least a portion of the purchaser-context information,
identifying, in the knowledge representation, a second concept with which the at least one advertising word or phrase shares at least one label,
determining a semantic relevance between the first concept and the second concept based at least in part on the first and second concepts' relative positions in a topology of the knowledge representation, and
computing the value of the advertisement opportunity as a function of the determined semantic relevance between the first and second concepts;
comparing the computed value to a purchase price of the advertisement opportunity; and
purchasing the advertisement opportunity in response to determining that the computed value exceeds the purchase price.

13. The system of claim 12, wherein the method further comprises identifying the advertising word or phrase based on a retrieval operation or synthesis operation performed on the knowledge representation.

14. The system of claim 12, wherein the knowledge representation comprises a semantic network.

15. The system of claim 12, wherein identifying the second concept comprises:
obtaining a plurality of concepts semantically relevant to the first concept;
computing, for each of one or more concepts in the plurality of concepts, a score indicative of the semantic relevance of the respective concept to the first concept; and
selecting the second concept from the one or more concepts based on the computed scores.

16. The system of claim 12, wherein the method further comprises presenting the advertisement opportunity and/or the at least one advertising word or phrase, prior to the purchase, to the at least one purchaser.

17. The system of claim 12, wherein the method further comprises presenting the computed value to the at least one purchaser.

18. The system of claim 12, wherein the purchasing is performed by an agent.

19. The system of claim 15, wherein the method further comprises performing, by the agent, at least one act selected from the group consisting of:
identifying the purchase price of the advertisement opportunity associated with the at least one advertising word or phrase;
requesting approval for the purchasing; and
reporting an imminent purchase or the purchasing of the advertisement opportunity.

20. The system of claim 12, wherein obtaining the purchaser-context information comprises receiving registration information from the at least one purchaser, purchaser website information, information typed in the by at least one purchaser and/or information highlighted by the at least one purchaser.

21. The system of claim 12, wherein identifying the first concept in the knowledge representation comprises:
searching the knowledge representation for the first concept; and/or
generating the first concept and adding the generated first concept to the knowledge representation.

22. The system of claim 12, wherein computing the value of the advertisement opportunity comprises allocating a portion of the at least one purchaser's purchasing budget determined based at least in part on the semantic relevance between the first and second concepts.

23. A non-transitory computer-readable medium storing code that, when executed on a computer device, adapts the device to perform a method for purchasing an advertisement opportunity based on a knowledge representation, the method comprising:
obtaining purchaser-context information associated with at least one purchaser;
computing a value, specific to the at least one purchaser, of an advertisement opportunity associated with at least one advertising word or phrase, the computing comprising:

identifying, in a knowledge representation encoded as a data structure, a first concept representing at least a portion of the purchaser-context information, identifying, in the knowledge representation, a second concept with which the at least one advertising word or phrase shares at least one label, determining a semantic relevance between the first concept and the second concept based at least in part on the first and second concepts' relative positions in a topology of the knowledge representation, and computing the value of the advertisement opportunity as a function of the determined semantic relevance between the first and second concepts;

comparing the computed value to a purchase price of the advertisement opportunity; and purchasing the advertisement opportunity in response to determining that the computed value exceeds the purchase price.

24. The non-transitory computer-readable medium of claim 23, wherein the method further comprises identifying the advertising word or phrase based on a retrieval operation or synthesis operation performed on the knowledge representation.

25. The non-transitory computer-readable medium of claim 23, wherein identifying the first concept in the knowledge representation comprises:

searching the knowledge representation for the first concept; and/or generating the first concept and adding the generated first concept to the knowledge representation.

26. The non-transitory computer-readable medium of claim 23, wherein computing the value of the advertisement opportunity comprises allocating a portion of the at least one purchaser's purchasing budget determined based at least in part on the semantic relevance between the first and second concepts.

* * * * *